United States Patent
Chen et al.

(10) Patent No.: US 9,674,525 B2
(45) Date of Patent: Jun. 6, 2017

(54) MULTIVIEW VIDEO CODING

(75) Inventors: Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 845 days.

(21) Appl. No.: 13/559,281

(22) Filed: Jul. 26, 2012

(65) Prior Publication Data

US 2013/0114705 A1     May 9, 2013

Related U.S. Application Data

(60) Provisional application No. 61/512,771, filed on Jul. 28, 2011.

(51) Int. Cl.
*H04N 7/26* (2006.01)
*H04N 19/50* (2014.01)
(Continued)

(52) U.S. Cl.
CPC ....... *H04N 19/00569* (2013.01); *H04N 19/44* (2014.11); *H04N 19/50* (2014.11);
(Continued)

(58) Field of Classification Search
CPC ........... H04N 19/00569; H04N 19/597; H04N 19/44; H04N 19/70; H04N 19/61; H04N 19/50
(Continued)

(56) References Cited

U.S. PATENT DOCUMENTS

| 7,970,221 B2 | 6/2011 | Yang |
| 8,139,150 B2 | 3/2012 | Nakamura et al. |

(Continued)

FOREIGN PATENT DOCUMENTS

| EP | 1971154 A1 | 5/2006 |
| JP | 2008182669 A | 8/2008 |

(Continued)

OTHER PUBLICATIONS

Wiegand et al., "WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.

(Continued)

*Primary Examiner* — Zhihan Zhou
(74) *Attorney, Agent, or Firm* — Shumaker & Sieffert, P.A.

(57) ABSTRACT

Aspects of this disclosure relate to a method of coding video data. In an example, the method includes obtaining, from an encoded bitstream and for any view component of a first view, reference view information indicating one or more reference views for predicting view components of the first view. The method also includes including, for decoding a first view component in an access unit and in the first view, one or more reference candidates in a reference picture list, where the one or more reference candidates comprise view components in the access unit and in the reference views indicated by the reference view information, where the number of reference candidates is equal to the number of reference views. The method also includes decoding the first view component based on the one or more reference candidates in the reference picture list.

60 Claims, 11 Drawing Sheets

(51) Int. Cl.
| | |
|---|---|
| *H04N 19/597* | (2014.01) |
| *H04N 19/70* | (2014.01) |
| *H04N 19/61* | (2014.01) |
| *H04N 19/44* | (2014.01) |

(52) U.S. Cl.
CPC ............ *H04N 19/597* (2014.11); *H04N 19/61* (2014.11); *H04N 19/70* (2014.11)

(58) Field of Classification Search
USPC ........................................ 375/240.02, 240.12
See application file for complete search history.

(56) References Cited

U.S. PATENT DOCUMENTS

| | | | |
|---|---|---|---|
| 2007/0030356 | A1 | 2/2007 | Yea et al. |
| 2009/0147860 | A1* | 6/2009 | Pandit et al. ............ 375/240.26 |
| 2010/0002762 | A1* | 1/2010 | Pandit et al. ............ 375/240.01 |
| 2010/0020872 | A1 | 1/2010 | Shimizu et al. |
| 2010/0027654 | A1 | 2/2010 | Jeon et al. |
| 2010/0061452 | A1* | 3/2010 | Pandit et al. ............ 375/240.12 |
| 2010/0091881 | A1* | 4/2010 | Pandit et al. ............ 375/240.25 |
| 2010/0142617 | A1 | 6/2010 | Koo et al. |
| 2010/0189173 | A1 | 7/2010 | Chen et al. |
| 2010/0260265 | A1* | 10/2010 | Jeon et al. ............... 375/240.25 |
| 2010/0266042 | A1 | 10/2010 | Koo et al. |
| 2010/0316134 | A1 | 12/2010 | Chen et al. |
| 2011/0064146 | A1 | 3/2011 | Chen et al. |
| 2011/0310982 | A1 | 12/2011 | Yang et al. |
| 2012/0069903 | A1 | 3/2012 | Lim et al. |
| 2012/0106634 | A1* | 5/2012 | Jeon et al. ............... 375/240.12 |
| 2012/0147137 | A1* | 6/2012 | Jeon ................... H04N 21/2365 348/43 |
| 2012/0257838 | A1 | 10/2012 | Kitagawa et al. |
| 2012/0269275 | A1 | 10/2012 | Hannuksela |
| 2013/0034170 | A1 | 2/2013 | Chen et al. |
| 2013/0155184 | A1 | 6/2013 | Chen et al. |

FOREIGN PATENT DOCUMENTS

| | | | |
|---|---|---|---|
| JP | 2009100070 A | 5/2009 | |
| JP | 2009532930 A | 9/2009 | |
| JP | 2010514353 A | 4/2010 | |
| KR | WO 2010120033 A1 * | 10/2010 | ......... H04N 21/2365 |
| KR | WO 2010123198 A2 * | 10/2010 | ........... H04N 19/597 |
| RU | 2374786 C1 | 11/2009 | |
| RU | 2008142771 A | 5/2010 | |
| RU | 2009103915 A | 8/2010 | |
| RU | 2407221 C1 | 12/2010 | |
| WO | 2007114608 A1 | 10/2007 | |
| WO | WO 2007114608 A1 * | 10/2007 | |
| WO | 2007126508 A2 | 11/2007 | |
| WO | 2007126509 A2 | 11/2007 | |
| WO | 2008005574 A2 | 1/2008 | |
| WO | 2008088497 A2 | 7/2008 | |
| WO | WO 2008088497 A2 * | 7/2008 | |
| WO | 2010079921 A2 | 7/2010 | |
| WO | 2010096189 A1 | 8/2010 | |
| WO | 2011002723 A1 | 1/2011 | |
| WO | 2011013257 A1 | 2/2011 | |
| WO | 2011035211 A2 | 3/2011 | |
| WO | 2011074153 A1 | 6/2011 | |

OTHER PUBLICATIONS

Bross et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.
Bross et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d21, pp. 290.
Bross et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.
Bross et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, pp. 226.
Bross et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), pp. 214.
Chen et al., "The Emerging MVC Standard for 3D Video Services," EURASIP Journal on Advances in Signal Processing, vol. 2009, Article ID 786015, 2009, pp. 13.
Gruneberg et al., "Deliverable D3.2 MVC/SVC storage format" Jan. 29, 2009 (Jan. 29, 2009), XP002599508 Retrieved from the Internet: URL:http://www.ist-sea.eu/Public/SEA_D3.2_HHI FF_20090129.pdf [retrieved on Sep. 1, 2010] paragraph [02.3].
International Search Report and Written Opinion dated Nov. 6, 2012 for corresponding PCT Application No. PCT/US2012/048478 pp. 15.
ITU-T H.264, Series H: Audiovisual and Multimedia Systems, Infrastructure of audiovisual services—Coding of moving video, Advanced video coding for generic audiovisual services, The International Telecommunication Union. Jun. 2011, pp. 674.
ITU-T, "Information technology a Generic coding of moving pictures and associated audio information: Systems; H.222.0 (2006) Amendment 4 (Dec. 2009)", ITU-T Standard, International Telecommunication Union, Geneva ; CH, No. 20120704, Dec. 14, 2009 (Dec. 14, 2009), pp. 1-30, XP017575448, [retrieved on Jun. 14, 2010].
Pandit et al., "H.264|AVC extension for MVC using SEI message", Joint Video Team (JVT) of ISO/IEC MPEG & ITU-T VCEG (ISO/IEC JTC1/SC29/WG11 and ITU-T SG16 Q6), No. JVT-X061, Jun. 29, 2007 (Jun. 29, 2007), pp. 1-14, XP002506970.
Sullivan et al., Document: JVT-AA007, "Editors' Draft Revision to ITU-T Rec. H.264|ISO/IEC 14496-10 Advanced Video Coding—In Preparation for ITU-T SG 16 AAP Consent (in integrated form)," Joint Video Team (JVT) of ISO/IEC MPEG & ITU-T VCEG (ISO/IEC JTC1/SC29/WG11 and ITU-T SG16 Q.6), 30th Meeting: Geneva, CH, Jan. 29-Feb. 3, 2009, pp. 1-683, http://wftp3.itu.int/av-arch/jvt-site/2009_01_Geneva/JVT-AD007.zip.
U.S. Appl. No. 13/559,269, by Chen et al., filed Jul. 26, 2012.
Wiegand et al., "WD3: Working Draft 3 of High-Efficiency Video Coding," Document JCTVC-E603, 5th Meeting: Geneva, CH, Mar. 16-23, 2011,pp. 193.
Wiegand et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012].
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Boyce, et al., "JCT-VC break-out report: Reference picture buffering and list construction (AHG21)," Document: JCTVC-G1002, Joint Collaborative Team on Video Coding (JCT-VC) of ITU-T SG16 WP3 and ISO/IEC JTC1/SC29/WG11, 7th Meeting: Geneva, CH, Nov. 21-30, 2011, 21 pp.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
Bross, et al., "High Efficiency Video Coding (HEVC) text specification draft 9," Joint Collaborative Team on Video Coding (JCT-

(56) References Cited

OTHER PUBLICATIONS

VC) of ITU-T SG16 WP3 and ISO/IEC JTC1/SC29/WG11, 11th Meeting: Shanghai, CN, Oct. 10-19, 2012, JCTVC-K1003_v7, 290 pp.
International Preliminary Report on Patentability—PCT/US2012/048478—The International Bureau of WIPO Geneva Switzerland Oct. 1, 2013, 8 pp.
Sjoberg, et al., "Absolute signaling of reference pictures", JCT-VC Meeting; MPEG Meeting; Jul. 14, 2011-Jul. 22, 2011; Torino; (Joint Collaborative Team on Video Coding of ISO/IEC JTC1/SC29/WG11 and ITU-T SG.16 ); URL: http://wftp3.itu.int/av-arch/jctvc-site/., No. JCTVC-F493, XP030009516, 10 pp.
Sullivan, et al., Editors' draft revision to ITU-T Rec. H.264 ISO/IEC 14496-10 Advanced Video Coding—in preparation for ITU-T SG 16 AAP Consent (in integrated form), Joint Video Team (JVT) of ISO/IEC MPEG & ITU-T VCEG (ISO/IEC JTC1/SC29/WG11 and ITU-T SG16 Q.6), Document: JVT-AA007, Filename: JVT-AD007.doc, 30th Meeting: Geneva, CH, Jan. 29-Feb. 3, 2009, 683 pp.
Tech, et al., "3D-HEVC Test Model 1," Document JCT3V-A1005_d0, Joint Collaborative Team on 3D Video Coding Extension Development of ITU-T SG 16 WP 3 and ISO/IEC JTC 1/SC 29/WG 11, 1st Meeting: Stockholm, SE, Jul. 16-20, 2012, 83 pp.
"Text of ISO/IEC FDIS 23002-3 Representation of Auxiliary Video and Supplemental Information", MPEG Meeting;Jan. 15, 2007-Jan. 19, 2007; Marrakech; (Motion Pictureexpert Group or ISO/IEC JTC1/SC29/WG11), No. N8768, XP030015262, ISSN: 0000-0132, 30 pp.
Vetro, et al., "Joint Draft 8.0 on Multiview Video Coding", JVT-AB204, Joint Video Team (JVT) of ISO/IEC MPEG & ITU-T VCEG (ISO/IEC JTC1/SC29/WG11 and ITU-T SG16 Q.6), 28th Meeting: Hannover, DE, Jul. 20-25, 2008, 63 pp.
Response to Written Opinion dated Nov. 6, 2012, from International Application No. PCT/US2012/04878, 38 pp.
Second Written Opinion from International Application No. PCT/US2012/04878, dated Jul. 1, 2013, 5 pp.
Response to Second Written Opinion dated Jul. 1, 2013, from International Application No. PCT/US2012/04878, filed Aug. 30, 2013, 7 pp.
Boyce, et al., "Picture parameter set RBSP syntax," 7th Meeting, Geneva, CH, Nov. 21-30, 2011, Document: JCTVC-G1002_r1, 9 pp.

Office Action from counterpart Japanese Application No. 2014-523053, dated Apr. 7, 2015, 4 pp.
Examination Report from counterpart Canadian Application No. 2,843,189, dated Jun. 11, 2015, 3 pp.
Notice of Grounds for Rejection from counterpart Korean Application No. 2014-7005397, dated Jun. 22, 2015, 11 pp.
Official Action and translation from counterpart Russian Application No. 2014107707, dated May 27, 2015, 11 pp.
Response to Canadian Office Action from corresponding Canadian Application Serial No. 2,843,189, filed on Dec. 11, 2015 (37 pages).
Final Office Action from U.S. Appl. No. 13/559,269 dated Sep. 30, 2015 (19 pages).
Response to Final Office Action dated Sep. 30, 2015 from U.S. Appl. No. 13/559,269 filed Nov. 30, 2015 (5 pages).
Amendment from U.S. Appl. No. 13/559,269 filed on Jan. 29, 2016 (20 pages).
Wang, et al., "AHG12: Example 3D-HEVC NAL Unit Header Design," Joint Collaborative Team on Video Coding (JCT-VC) of ITU-T SG 16 WP3 and ISO/IEC JTC 1/SC 29/WG 11, Apr. 27-May 7, 2012; 9th Meeting: Geneva, CH, Apr. 28, 2012, JCTVC-I0570, 3 pp.
Examination Search Report from counterpart Canadian Application No. 2,843,189, dated Apr. 22, 2016, 3 pp.
Examination Search Report from Canadian Application No. 2,843,187, dated Mar. 21, 2016, 5 pp.
Response to Office Action dated Feb. 23, 2016 from U.S. Appl. No. 13/559,269, filed May 23, 2016 (4 pages).
Office Action from U.S. Appl. No. 13/559,269, dated Feb. 23, 2016, 18 pp.
Wang et al., "AHG12: Video parameter set and its use in 3D-HEVC," Joint Collaborative Team on Video Coding (JCT-VC) of ITU-T SG 16 WP 3 and ISO/IEC JTC 1/SC 29/WG 11, 9 Meeting, Geneva, Apr. 27-May 7, 2012, JCTVC-I0571, 9 pp.
Decision for Grant of Patent from counterpart Korean Patent Application No. 2014-7005398, mailed Jan. 27, 2016, 3 pp.
Decision for Grant of Patent from counterpart Korean Patent Application No. 2014-7005397, mailed Jan. 26, 2016, 3 pp.
"Technology Under Study for Buffer Management and High-level Syntax in Multiview Video Coding", 76. MPEG Meeting;Mar. 4, 2006-Jul. 4, 2006; Montreux; (Motion Picture Expert Group or ISO/IEC JTC1/SC29/WG11), No. N8018, Apr. 10, 2006 (Apr. 10, 2006), XP030014510, 10 pages.

* cited by examiner

MULTIVIEW VIDEO CODING

This disclosure claims priority to U.S. Provisional Application No. 61/512,771 filed 28 Jul. 2011, the contents of which is incorporated by reference in its entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a picture or a portion of a picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding video data. For example, this disclosure describes techniques for performing Multiview Video Coding (MVC), and for an MVC extension for the HEVC video coding standard presently under development. That is, MVC is a video coding technique for encapsulating multiple views of video data. Each view may correspond to a different perspective, or angle, at which corresponding video data of a common scene was captured. The techniques of this disclosure generally relate to formation of MVC network abstraction layer (NAL) units, MVC parameter sets, and the like.

In an example, aspects of this disclosure are directed to a method of decoding video data that includes obtaining, from an encoded bitstream, one or more network abstraction layer (NAL) units for each view component of a plurality of view components of encoded video data, wherein each view component of the plurality of view components corresponds to a common temporal location, and wherein the one or more NAL units encapsulate at least a portion of the encoded video data for the respective view components and include information indicative of a decoding order of the respective view components; obtaining information, from the encoded bitstream and separate from the NAL units, indicating relationships between view identifiers for the views and the decoding order of the view components; and decoding the encoded video data of the plurality of view components in the decoding order based on the received information.

In another example, aspects of this disclosure are directed to an apparatus for decoding video data that includes one or more processors configured to obtain, from an encoded bitstream, one or more network abstraction layer (NAL) units for each view component of a plurality of view components of encoded video data, wherein each view component of the plurality of view components corresponds to a common temporal location, and wherein the one or more NAL units encapsulate at least a portion of the encoded video data for the respective view components and include information indicative of a decoding order of the respective view components; obtain information, from the encoded bitstream and separate from the NAL units, indicating relationships between view identifiers for the views and the decoding order of the view components; and decode the encoded video data of the plurality of view components in the decoding order based on the received information.

In another example, aspects of this disclosure are directed to an apparatus for decoding video data that includes means for obtaining, from an encoded bitstream, one or more network abstraction layer (NAL) units for each view component of a plurality of view components of encoded video data, wherein each view component of the plurality of view components corresponds to a common temporal location, and wherein the one or more NAL units encapsulate at least a portion of the encoded video data for the respective view components and include information indicative of a decoding order of the respective view components; means for obtaining information, from the encoded bitstream and separate from the NAL units, indicating relationships between view identifiers for the views and the decoding order of the view components; and means for decoding the encoded video data of the plurality of view components in the decoding order based on the received information.

In another example, aspects of this disclosure are directed to a non-transitory computer-readable storage medium having instructions stored thereon that, when executed, cause one or more processors to obtain, from an encoded bitstream, one or more network abstraction layer (NAL) units for each view component of a plurality of view components of encoded video data, wherein each view component of the plurality of view components corresponds to a common temporal location, and wherein the one or more NAL units encapsulate at least a portion of the encoded video data for the respective view components and include information indicative of a decoding order of the respective view components; obtain information, from the encoded bitstream and separate from the NAL units, indicating relationships between view identifiers for the views and the decoding order of the view components; and decode the encoded video data of the plurality of view components in the decoding order based on the received information.

In another example, aspects of this disclosure are directed to a method of encoding video data that includes encoding video data for a plurality of view components for respective views of video data, wherein each of the plurality of view components corresponds to a common temporal location; forming, as part of an encoded bitstream, one or more network abstraction layer (NAL) units for the encoded video data of each of the view components such that the NAL units include information indicative of a decoding order of the video data of the respective view components and encapsulate at least a portion of the encoded video data for the respective view components; and providing information in the encoded bitstream, separate from the NAL units, indicating relationships between view identifiers for the views and the decoding order of the view components.

In another example, aspects of this disclosure are directed to an apparatus for encoding video data, the apparatus comprising one or more processors configured to encode video data for a plurality of view components for respective views of video data, wherein each of the plurality of view components corresponds to a common temporal location; form, as part of an encoded bitstream, one or more network abstraction layer (NAL) units for the encoded video data of each of the view components such that the NAL units include information indicative of a decoding order of the video data of the respective view components and encapsulate at least a portion of the encoded video data for the respective view components; and provide information in the encoded bitstream, separate from the NAL units, indicating relationships between view identifiers for the views and the decoding order of the view components.

In another example, aspects of this disclosure are directed to an apparatus for encoding video data that includes means for encoding video data for a plurality of view components for respective views of video data, wherein each of the plurality of view components corresponds to a common temporal location; means for forming, as part of an encoded bitstream, one or more network abstraction layer (NAL) units for the encoded video data of each of the view components such that the NAL units include information indicative of a decoding order of the video data of the respective view components and encapsulate at least a portion of the encoded video data for the respective view components; and means for providing information in the encoded bitstream, separate from the NAL units, indicating relationships between view identifiers for the views and the decoding order of the view components.

In another example, aspects of this disclosure are directed to a non-transitory computer-readable storage medium having instructions stored thereon that, when executed, cause one or more processors to encode video data for a plurality of view components for respective views of video data, wherein each of the plurality of view components corresponds to a common temporal location; forming, as part of an encoded bitstream, one or more network abstraction layer (NAL) units for the encoded video data of each of the view components such that the NAL units include information indicative of a decoding order of the video data of the respective view components and encapsulate at least a portion of the encoded video data for the respective view components; and provide information in the encoded bitstream, separate from the NAL units, indicating relationships between view identifiers for the views and the decoding order of the view components.

In another example, aspects of this disclosure are directed to a method of decoding video data that includes obtaining, from an encoded bitstream and for any view component of a first view, reference view information indicating one or more reference views for predicting view components of the first view; including, for decoding a first view component in an access unit and in the first view, one or more reference candidates in a reference picture list, wherein the one or more reference candidates comprise view components in the access unit and in the reference views indicated by the reference view information, wherein the number of reference candidates is equal to the number of reference views; and decoding the first view component based on the one or more reference candidates in the reference picture list.

In another example, aspects of this disclosure are directed to an apparatus for decoding video data, the apparatus comprising one or more processors configured to obtain, from an encoded bitstream and for any view component of a first view, reference view information indicating one or more reference views for predicting view components of the first view; include, for decoding a first view component in an access unit and in the first view, one or more reference candidates in a reference picture list, wherein the one or more reference candidates comprise view components in the access unit and in the reference views indicated by the reference view information, wherein the number of reference candidates is equal to the number of reference views; and decode the first view component based on the one or more reference candidates in the reference picture list.

In another example, aspects of this disclosure are directed to an apparatus for decoding video data, the apparatus comprising means for obtaining, from an encoded bitstream and for any view component of a first view, reference view information indicating one or more reference views for predicting view components of the first view; means for including, for decoding a first view component in an access unit and in the first view, one or more reference candidates in a reference picture list, wherein the one or more reference candidates comprise view components in the access unit and in the reference views indicated by the reference view information, wherein the number of reference candidates is equal to the number of reference views; and means for decoding the first view component based on the one or more reference candidates in the reference picture list.

In another example, aspects of this disclosure are directed to a non-transitory computer-readable storage medium having instructions stored thereon that, when executed, cause one or more processors to obtain, from an encoded bitstream and for any view component of a first view, reference view information indicating one or more reference views for predicting view components of the first view; include, for decoding a first view component in an access unit and in the first view, one or more reference candidates in a reference picture list, wherein the one or more reference candidates comprise view components in the access unit and in the reference views indicated by the reference view information, wherein the number of reference candidates is equal to the number of reference views; and decode the first view component based on the one or more reference candidates in the reference picture list.

In another example, aspects of this disclosure are directed to a method of encoding video data comprising determining, for any view component of a first view, reference view information indicating one or more reference views for predicting view components of the first view; including, for encoding a first view component in an access unit and in the first view, one or more reference candidates in a reference picture list, wherein the one or more reference candidates comprise view components in the access unit and in the reference views indicated by the reference view information, wherein the number of reference candidates is equal to the number of reference views; encoding the first view component based on the one or more reference candidates in the reference picture list; and providing the encoded first view component with the determined reference view information in an encoded bitstream.

In another example, aspects of this disclosure are directed to an apparatus for encoding video data comprising one or more processors configured to determine, for any view component of a first view, reference view information indicating one or more reference views for predicting view components of the first view; include, for encoding a first view component in an access unit and in the first view, one or more reference candidates in a reference picture list, wherein the one or more reference candidates comprise view components in the access unit and in the reference views indicated by the reference view information, wherein the number of reference candidates is equal to the number of reference views; encode the first view component based on the one or more reference candidates in the reference picture list; and provide the encoded first view component with the determined reference view information in an encoded bitstream.

In another example, aspects of this disclosure are directed to An apparatus for encoding video data, the apparatus comprising means for determining, for any view component of a first view, reference view information indicating one or more reference views for predicting view components of the first view; means for including, for encoding a first view component in an access unit and in the first view, one or more reference candidates in a reference picture list, wherein the one or more reference candidates comprise view components in the access unit and in the reference views indicated by the reference view information, wherein the number of reference candidates is equal to the number of reference views; means for encoding the first view component based on the one or more reference candidates in the reference picture list; and means for providing the encoded first view component with the determined reference view information in an encoded bitstream.

In another example, aspects of this disclosure are directed to a non-transitory computer-readable storage medium having instructions stored thereon that, when executed, cause one or more processors to determine, for any view component of a first view, reference view information indicating one or more reference views for predicting view components of the first view; include, for encoding a first view component in an access unit and in the first view, one or more reference candidates in a reference picture list, wherein the one or more reference candidates comprise view components in the access unit and in the reference views indicated by the reference view information, wherein the number of reference candidates is equal to the number of reference views; encode the first view component based on the one or more reference candidates in the reference picture list; and provide the encoded first view component with the determined reference view information in an encoded bitstream.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
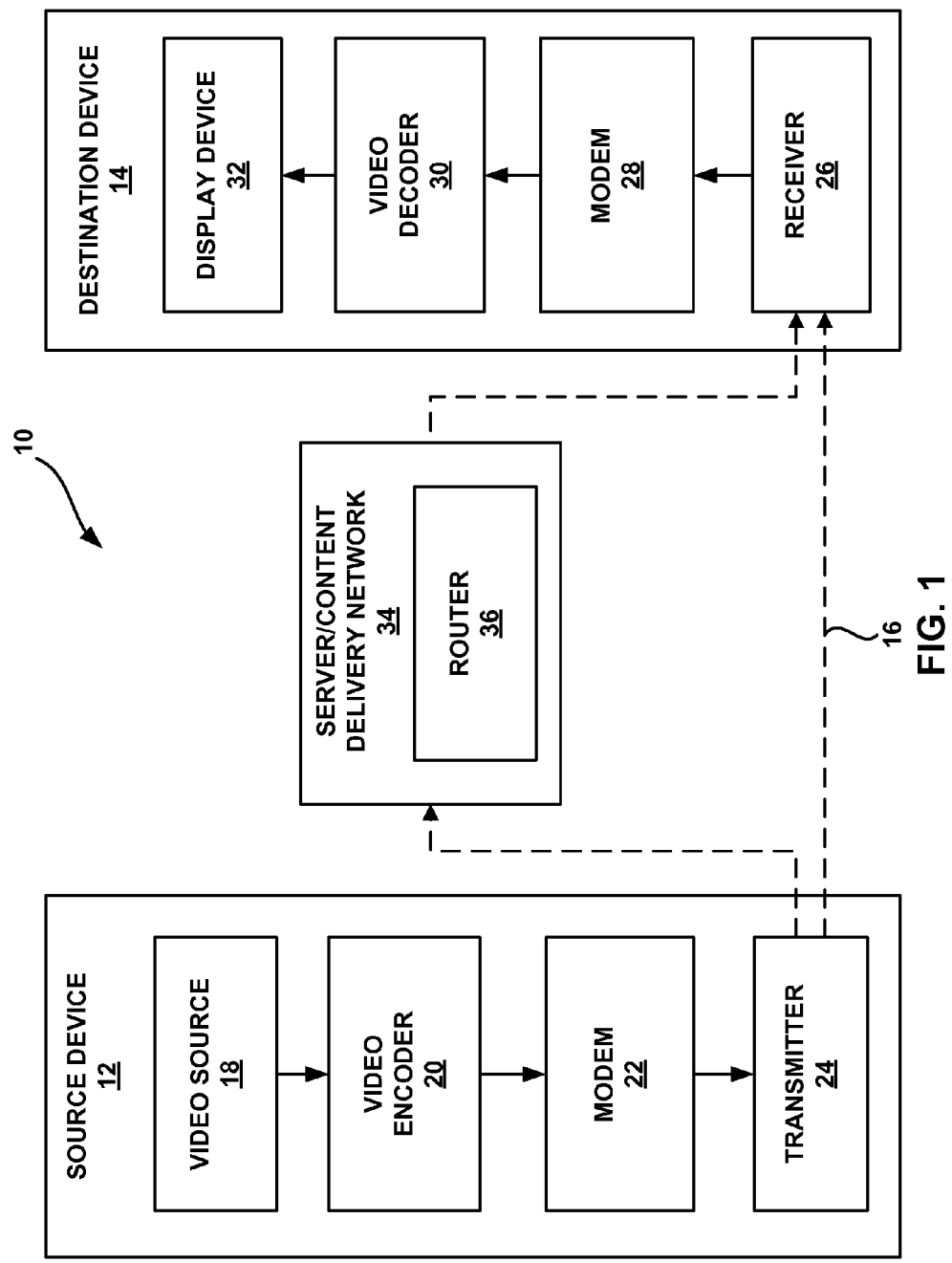
FIG. 1 is a block diagram illustrating an example video encoding and decoding system that may utilize the techniques described in this disclosure.

According to certain video coding systems, motion estimation and motion compensation may be used to reduce the temporal redundancy in a video sequence, so as to achieve data compression. In this case, a motion vector can be generated that identifies a predictive block of video data, e.g., a block from another video picture or slice, which can be used to predict the values of the current video block being coded. The values of the predictive video block are subtracted from the values of the current video block to produce a block of residual data. Motion information (e.g., a motion vector, motion vector indexes, prediction directions, or other information) is communicated from a video encoder to a video decoder, along with the residual data. The decoder can locate the same predictive block (based on the motion vector) and reconstruct the encoded video block by combining the residual data with the data of the predictive block.

Multiview Video Coding (MVC) is a video coding standard for encapsulating multiple views of video data. In general, each view corresponds to a different perspective, or angle, at which corresponding video data of a common scene was captured. The coded views can be used for three-dimensional (3D) display of video data. For example, two views (e.g., left and right eye views of a human viewer) may be displayed simultaneously or near simultaneously using different polarizations of light, and a viewer may wear passive, polarized glasses such that each of the viewer's eyes receives a respective one of the views. Alternatively, the viewer may wear active glasses that shutter each eye independently, and a display may rapidly alternate between images of each eye in synchronization with the glasses.

In MVC, a particular picture of a particular view is referred to as a view component. That is, a view component of a view corresponds to particular temporal instance of the view. Multi-view video may contain a relatively large amount of inter-view statistical dependencies, as all cameras used to capture the multi-view data capture the same scene from different viewpoints. Such dependencies can be exploited for combined temporal and/or inter-view prediction, where images are not only predicted from temporally neighboring images, but also from corresponding images from other views. That is, inter-view prediction may be performed among pictures in the same access unit (i.e., within the same time instance).

Inter-view prediction is generally realized as if the view component in another view is an inter prediction reference. Rather than using "motion" vectors for prediction, inter-view prediction utilizes "displacement" vectors, which are conceptually similar to motion vectors but describe displacement rather than motion. The potential inter-view references are signaled in the Sequence Parameter Set (SPS) MVC extension and can be modified by the reference picture list construction process, which enables flexible ordering of the inter prediction or inter-view prediction references.

Video data, including MVC video data, may be organized into Network Abstraction Layer (NAL) units, which provide a "network-friendly" video representation to address applications such as video telephony, storage, broadcast, or streaming. For example, a video encoder commonly encodes each picture of video data as one or more independently decodable slices. The slices may be packaged into NAL units for transmission across the network. NAL units including video coding layer (VCL) data may include data for a picture or data for a slice of a picture. For example, NAL units may include syntax information such as coded block pattern (CBP) values, block type, coding mode, maximum block size for a coded unit (such as a frame, slice, block, or sequence), or other information.

Each NAL unit includes a header that identifies a type of data stored in the NAL unit. An example MVC NAL unit header may include syntax elements indicating a view identifier for the view to which the NAL unit belongs, whether the NAL unit belongs to a so-called anchor picture that can be used as a random access point (for reference by other view components), whether the NAL unit is used for inter-view prediction for NAL units in other views, and a variety of other information. As described herein, an anchor picture may generally correspond to a random access picture, and such terms may be used interchangeably. That is, "random access" generally refers to the act of starting a decoding process for a bitstream at a point other than the beginning of the stream. A random access picture generally relates to a picture that contains only intra-coded slices (I-slices). Coded pictures that follow a random access picture in both decoding order and output order are not predicted from pictures preceding the random access picture, either in decoding order or output order.

In general, an access unit may include all view components of a particular time instance. A particular view component includes all NAL units of a particular view at a particular time instance. An MVC NAL unit may contain a one byte NAL unit header (including the NAL unit type) and may further include a MVC NAL unit header extension.

While H.264/AVC includes MVC support, the current MVC extension to H.264/AVC may contain several inefficiencies with respect to other video coding standards. Moreover, as discussed in greater detail below, a direct import of MVC from H.264/AVC to other coding standards, such as the upcoming HEVC standard, may not be feasible. The techniques of this disclosure generally relate to formation of MVC related NAL units, MVC related parameter sets, and the like. Certain techniques of this disclosure may enable efficient MVC coding for the upcoming HEVC standard.

FIG. 1 is a block diagram illustrating an example video encoding and decoding system 10 that may utilize techniques for motion vector prediction in multiview coding. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for motion vector prediction in multiview coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for motion vector prediction in multiview coding may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

In the example shown in FIG. 1, system 10 also includes server/content delivery network 34 having router 36. In some examples, source device 12 may communicate with server/content delivery network 34 via a variety of wireless and/or wired transmission or storage media, as described above. Moreover, while shown separately in the example of FIG. 1, in some examples, source device 12 and server/content delivery network 34 comprise the same device. Server/content delivery network 34 may store one or more versions of coded video data (from video encoder 20 of source device 12), and may make such coded video data available for access by destination device 14 and video decoder 30. In some examples, router 36 may be responsible for providing coded video data to destination device 14 in a requested format.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263.

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of pictures. As described herein, "picture" and "frame" may be used interchangeably. That is, picture containing video data may be referred to as video frame, or simply "frame." A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, picture-based syntax data, and GOP-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

In some examples, video encoder 20 may generate and video decoder 30 may receive certain parameter sets, which may be used when decoding video data. For example, parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence (e.g., sequence of pictures) or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as Supplemental Enhancement Information (SEI) NAL units.

SEI NAL units (referred to as SEI messages) may contain information that is not necessary for decoding the coded pictures samples from VCL NAL units, but may assist in processes related to decoding, display, error resilience, and other purposes. SEI messages may be contained in non-VCL NAL units. SEI messages may be included in the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC.

In some examples, video encoder 20 may encode an MVC bitstream that conforms to the MVC extension to H.264/AVC. Likewise, video decoder 30 may decode an MVC bitstream that conforms to the MVC extension to H.264/AVC. The latest joint draft of MVC is described in JVT-AD007, "Editors' draft revision to ITU-T Rec. H.264|ISO/IEC 14496-10 Advanced Video Coding," 30$^{th}$ JVT meeting, Geneva, Switzerland, January-February 2008, available publically from http://wftp3.itu.int/av-arch/jvt-site/2009_01_Geneva/JVT-AD007.

In the scalable extension of H.264/AVC, syntax elements may be added in the NAL unit header extension to extend the NAL unit header from one byte to four bytes to describe the characteristics of a VCL NAL unit in multiple dimensions. Thus, a VCL NAL unit in HEVC may include a longer NAL unit header than the NAL unit header in the H.264/AVC standard. The MVC extension to H.264/AVC may be referred to in this disclosure as "MVC/AVC."

An MVC/AVC NAL unit may contain a one byte NAL unit header that includes the NAL unit type, as well as an MVC/AVC NAL unit header extension. As one example, the MVC/AVC NAL unit header extension may include the syntax elements in the following Table 1:

TABLE 1

NAL UNIT HEADER EXENSION SYNTAX

| nal_unit_header_extension( ) { | C | Descriptor |
|---|---|---|
| reserved_zero_bit | All | u(1) |
| idr_flag | All | u(1) |
| priority_id | All | u(6) |
| view_id | All | u(10) |

TABLE 1-continued

NAL UNIT HEADER EXENSION SYNTAX

| nal_unit_header_extension( ) { | C | Descriptor |
|---|---|---|
| temporal_id | All | u(3) |
| anchor_pic_flag | All | u(1) |
| inter_view_flag | All | u(1) |
| reserved_one_bit | All | u(1) |
| } | | |

In Table 1 above, the idr_flag element may indicate whether the NAL unit belongs to an instant decode refresh (IDR) or a view-IDR (V-IDR) picture that can be used as a closed-GOP random access point. For example, an IDR picture and all of the pictures succeeding the IDR picture in both a display order and bitstream order can be properly decoded without decoding previous pictures in either bitstream order or display order. The priority_id element may be used with a bitstream adaptation process that varies the bitstream according to changing network conditions and/or capabilities of video decoder 30 and/or display device 32 (e.g., such as single-pass adaptation process). The view_id element may be used to indicate the view identifier for the view to which the NAL unit belongs, which may be used inside an MVC decoder, e.g., for inter-view prediction and outside a decoder, e.g., for rendering. In some instances, the view_id may be set equal to a predefined camera id, and may be relatively large. The temporal_id element may be used to indicate the temporal level of the current NAL unit, which may correspond to a particular frame rate.

The anchor_pic_flag element may be used to indicate whether the NAL unit belongs to an anchor picture that can be used as an open-GOP random access point. For example, anchor pictures and all the pictures succeeding the anchor picture in display order may be properly decoded without decoding previous pictures in the decoding order (i.e. bitstream order) and thus may be used as random access points. Anchor pictures and non-anchor pictures may have different view dependencies, both of which may be signaled in an SPS. That is, as described herein a, a view dependency may generally refer to a view from which a view currently being coded depends. In other words, view dependencies may set forth from which views a view currently being coded may be predicted. According to some examples, view dependency may be signaled in the SPS MVC extension. In such examples, all inter-view prediction may be done within the scope specified by the SPS MVC extension. The inter_view_flag element may be used to indicate whether the NAL unit is used for inter-view prediction for NAL units in other views.

To convey the above 4-byte NAL unit header information for the base view of an MVC bitstream, a prefix NAL unit may be defined in MVC. In the context of MVC, the base view access unit may include the VCL NAL units of a current time instance of a particular view, as well as a prefix NAL unit for the base view access unit, which may contain only the NAL unit header. If the prefix NAL unit is not required for decoding (e.g., such as decoding a single view), a decoder may ignore and/or discard the prefix NAL unit.

With respect to an SPS MVC/AVC extension, the MVC SPS may indicate views that may be used for purposes of inter-view prediction. For example, potential inter-view references may be signaled in and SPS MVC/AVC extension, and may be modified by the reference picture list construction process, which enables flexible ordering of the inter prediction or inter-view prediction references. An example MVC/AVC SPS is set forth in Table 2 below:

TABLE 2

EXAMPLE MVC SPS

| seq_parameter_set_mvc_extension( ) { | C | Descriptor |
|---|---|---|
|   num_views_minus1 | 0 | ue(v) |
|   for( i = 0; i <= num_views_minus1; i++ ) | | |
|     view_id[ i ] | 0 | ue(v) |
|   for( i = 1; i <= num_views_minus1; i++ ) { | | |
|     num_anchor_refs_l0[ i ] | 0 | ue(v) |
|     for( j = 0; j < num_anchor_refs_l0[ i ]; j++ ) | | |
|       anchor_ref_l0[ i ][ j ] | 0 | ue(v) |
|     num_anchor_refs_l1[ i ] | 0 | ue(v) |
|     for( j = 0; j < num_anchor_refs_l1[ i ]; j++ ) | | |
|       anchor_ref_l1[ i ][ j ] | 0 | ue(v) |
|   } | | |
|   for( i = 1; i <= num_views_minus1; i++ ) { | | |
|     num_non_anchor_refs_l0[ i ] | 0 | ue(v) |
|     for( j = 0; j < num_non_anchor_refs_l0[ i ]; j++ ) | | |
|       non_anchor_ref_l0[ i ][ j ] | 0 | ue(v) |
|     num_non_anchor_refs_l1[ i ] | 0 | ue(v) |
|     for( j = 0; j < num_non_anchor_refs_l1[ i ]; j++ ) | | |
|       non_anchor_ref_l1[ i ][ j ] | 0 | ue(v) |
|   } | | |
|   num_level_values_signalled_minus1 | 0 | ue(v) |
|   for( i = 0; i <= num_level_values_signalled_minus1; i++ ) { | | |
|     level_idc[ i ] | 0 | u(8) |
|     num_applicable_ops_minus1[ i ] | 0 | ue(v) |
|     for( j = 0; j <= num_applicable_ops_minus1[ i ]; j++ ) { | | |
|       applicable_op_temporal_id[ i ][ j ] | 0 | u(3) |
|       applicable_op_num_target_views_minus1[ i ][ j ] | 0 | ue(v) |
|       for( k = 0; k <= applicable_op_num_target_views_minus1[ i ][ j ]; k++ ) | | |
|         applicable_op_target_view_id[ i ][ j ][ k ] | 0 | ue(v) |
|       applicable_op_num_views_minus1[ i ][ j ] | 0 | ue(v) |
|     } | | |
|   } | | |
| } | | |

According to some examples, view dependency may be signaled in the SPS MVC extension. All inter-view prediction may be done within the scope specified by the SPS MVC extension. That is, the SPS may set forth which views may be referred to for purposes of prediction by a view currently being coded. In Table 2 above, the num_anchor_refs_l0[i] element may specify the number of view components for inter-view prediction in the initialized reference picture list for List 0 (e.g., RefPicList0). In addition, the anchor_ref_l0[i][j] element may specify the view_id of the j-th view component for inter-view prediction in the initialized RefPicList0. The num_anchor_refs_l1[i] element may specify the number of view components for inter-view prediction in the initialized reference picture list for list one (e.g., RefPicList1). The anchor_ref_l1[i][j] element may specify the view_id of the j-th view component for inter-view prediction in the initialized RefPicList1. The num_non_anchor_refs_l0[i] element may specify the number of view components for inter-view prediction in the initialized RefPicList0. The non_anchor_ref_l0[i][j] element may specify the view_id of the j-th view component for inter-view prediction in the initialized RefPicList0. The num_non_anchor_refs_l1[i] element may specify the number of view components for inter-view prediction in the initialized RefPicList1. The non_anchor_ref_l1[i][j] element may specify the view_id of the j-th view component for inter-view prediction in the initialized RefPicList.

The initialized, or "initial", reference picture list may be the same or different from a final reference picture list used for purposes of inter-view predicting view components. That is, certain reference candidates (i.e., reference pictures that may be used for inter-view prediction) may be removed from an initial reference picture list (e.g., redundant pictures). In addition, as described in greater detail below, reference candidates may be reordered from the initial reference picture list to form the final reference picture list.

In this example, according to MVC/AVC, view dependencies for anchor pictures and non-anchor pictures are separately maintained and signaled. That is, a video coder may determine a total of four reference picture lists (e.g., List 0, non-anchor pictures; List 1, non-anchor pictures; List 0, anchor pictures; List 1, anchor pictures). In addition, as shown in Table 2 above, separate signaling is required to indicate a view dependency to video decoder 30. That is, the SPS must include separate List 0 and List 1 signaling for both anchor_refs and non_anchor_refs.

Moreover, according to Table 2, the inter-view dependency for non-anchor view components is a subset of that for anchor view components. That is, for example, a view component of an anchor view may be predicted from more than one other view, such as view 3 and 4. A non-anchor view, however, may only be predicted from pictures of view 3 (a subset of the anchor view). In this way, the view dependencies for anchor and non-anchor view components may be separately maintained.

In addition, in Table 2, the num_level_values_signalled may specify the number of level values signaled for the coded video sequence. The level_idc[i] element may specify the i-th level value signaled for the coded video sequence. The num_applicable_ops_minus1[i] plus 1 element may specify the number of operation points to which the level indicated by level_idc1[i] applies. The applicable_op_temporal_id[i][j] element may specify the temporal_id of the j-th operation point to which the level indicated by level_idc[i] applies. The applicable_op_num_target_views_minus1[i][j] element may specify the number of target output views for the j-th operation point to which the level indicated by level_idc[i] applies. The applicable_op_target_view_id[i][j][k] element may specify the k-th target output view for the j-th operation point to which the level indicated by level_idc[i] applies. The applicable_op_num_views_minus1[i][j] element may specify the number of views, including the views that are dependent on by the target output views but that do not belong to the target output views, in the j-th operation point to which the level indicated by level_idc[i] applies.

Accordingly, in the SPS MVC extension, for each view, the number of views that may be used to form reference picture List 0 and reference picture List 1 may be signaled. In addition, the prediction relationship for an anchor picture, as signaled in the SPS MVC extension, may be different from the prediction relationship for the non-anchor picture (signaled in the SPS MVC extension) of the same view.

As described in greater detail below, video encoder 20 and video decoder 30 may flexibly arrange temporal and view prediction references when constructing reference picture lists. Allowing flexible arrangement provides not only potential coding efficiency gain, but also error resilience, because reference picture section and redundant picture mechanisms may be extended to the view dimension. Video encoder 20 and/or video decoder 30 may, in an example, construct a reference picture list according to the following steps:

1) Initialize the reference picture list for temporal (i.e., intra-view) reference pictures, such that reference pictures from other views are not considered.
2) Append the inter-view reference pictures to the end of the list in the order in which the pictures occur in the MVC SPS extension.
3) Apply a reference picture list reordering (RPLR) process for both intra-view and inter-view reference pictures. Inter-view reference pictures may be identified in the RPLR commands by their index values as specified in the MVC SPS extension.

While H.264/AVC includes MVC support, the current MVC extension to H.264/AVC may contain several inefficiencies with respect to other video coding standards. Moreover, as discussed in greater detail below, a direct import of MVC from H.264/AVC to other coding standards, such as the upcoming HEVC standard, may not be feasible. The techniques of this disclosure generally relate to formation of MVC related NAL units, MVC related parameter sets, and the like. While the techniques of this disclosure are not limited to any particular coding standard, certain techniques of this disclosure may enable efficient MVC coding for the upcoming HEVC standard.

As an example, the H.264/MVC standard supports up to 1024 views and uses a view identifier (view_id) in a NAL unit header to identify the view to which a NAL unit belongs. Because the view id is 10 bits long, over 1000 different views can be uniquely identified by the view id values. However, many three-dimensional (3D) video applications require considerably fewer views. Moreover, fewer views may be required for 3D video applications that use view synthesis to generate more views (which do not require coding). According to the MVC/AVC extension, the NAL unit header includes a 10 bit view id that is always provided. The view id may substantially increase the number of bits for the NAL unit header, which occupies a relatively large portion of the bitstream.

According to aspects of this disclosure, a view order index ("view_order_index" or "view_idx") may be signaled as part of a NAL unit header. That is, video encoder 20 may encode and transmit, and video decoder 30 may receive and decode, a view order index as part of a NAL unit header. For purposes of comparison, the view order index may replace the view id that is signaled in the NAL unit header of the MVC extension to H.264/AVC (hereinafter "MVC/AVC"). That is, for example, view_idx may replace view_id in a NAL unit header.

As discussed above, MVC provides inter-view prediction. Accordingly, views used for reference (that is, views that are used to predict other views) must occur in coding order earlier than the referring views, as discussed above. View order generally describes the ordering of the views in an access unit, and a view order index identifies a particular view in view order of the access unit. That is, a view order index describes the decoding order of a corresponding view component of an access unit.

An SPS may provide a relationship between view ids (view_ids) for the views and view order indexes for the views. According to aspects of this disclosure, using the view order index and the data in the SPS, video encoder 20 and video decoder 30 may replace the 10 bit view_id of MVC/AVC in the NAL unit header by the view order index. For example, a view order index may include substantially fewer than 10 bits (e.g., such as 2 bits, 3 bits, or the like). While the relationship between the view order index and view ids may require some associated signaling, e.g., in an SPS, NAL unit headers typically consume many more bits than such signaling. Accordingly, by reducing the size of the NAL unit headers, the techniques of this disclosure may achieve a bit savings over the MVC/AVC scheme. The information indicative of the relationship may comprise, for example a mapping table that maps view_id values to view order index values. In this manner, video decoder 30 may simply receive a view order index value in a NAL unit header and determine the view_id of the NAL unit using the mapping table.

According to some aspects of the disclosure, the view order index may have a dynamic length, depending on whether it is an HEVC base view, a profile, or a number of views supported in the MVC bitstream. For example, an additional bit savings may be achieved in an MVC stream that includes only two views (that is, for stereo video). In this example, a view order index may not be needed, as video decoder 30 may always decode a first view (e.g., view 0) prior to decoding a second view (e.g., view 1). That is, according to some aspects of this disclosure, a base view may be assigned with a default view order index of 0, and therefore does not need to be signaled.

In addition, a prefix NAL unit, which is included immediately prior to NAL units of a base view (e.g., view 0) of an MVC/AVC base view, may no longer be required when using the view order index described above. For example, video decoder 30 may no longer require a prefix NAL unit for a base view, because a view order index may always be zero for the base view, and a temporal position of the base view may be determined using the temporal_id (included in MCV/AVC). Accordingly, video encoder 20 may signal the temporal_id in a NAL unit header, which may provide all of the information needed for video decoder 30 to associate a particular view component with a particular view and with an appropriate temporal location.

With respect to the emerging HEVC standard, according to aspects of this disclosure, when a prefix NAL unit is not used for the HEVC compliant base view, a flag may be added into the NAL unit header of the HEVC base view. The flag may only be used to indicate whether the view component (of that particular NAL unit) may be used to inter-predict view components of other views of the bitstream.

In addition, according to aspects of the disclosure, the view order index can be used with a picture order count (POC) value (e.g., which indicates a display order of the pictures) or a frame value (e.g., which indicates a decoding order of the pictures) to identify a view component of a bitstream.

As another example, as noted above, the MVC/AVC SPS may indicate dependent views (i.e., views referred to by one or more other views for purposes of prediction) separately for each view. For example, an anchor_pic_flag included in an MVC/AVC NAL unit header may be used to indicate whether the NAL unit belongs to an anchor picture that can be used as an open-GOP random access point. In MVC/AVC, as described above, view dependency is signaled differently for anchor pictures and non-anchor pictures. Accordingly, for the dependent views signaled for each view, four different categories are considered, each of which is differentiated by whether a picture is for an anchor picture or whether a picture is for List 0 or List 1. Such a design not only requires a relatively large number of bits to maintain such demarcations, but also may complicate reference picture list construction (e.g., each category must be maintained during reference list construction and reordering).

According to aspects of this disclosure, video encoder 20 may signal (and video decoder 30 may receive such signaling) view dependency for each view of an MVC bitstream commonly for all view components, regardless of whether the view components are for anchor pictures and non-anchor pictures. In some examples, the SPS includes an indication of view dependencies for the view components, rather than relying on information in a NAL unit header. In this manner, video encoder 20 and video decoder 30 may not use the anchor_pic_flag used in the MVC/AVC NAL unit header.

A view component of a signaled dependent view may be used as a reference picture in both List 0 and List 1. In addition, reference picture list construction and reference picture list reordering for List 0 and List 1 may also be based on common signaling for anchor pictures and non-anchor pictures. In some examples, a sequence level, supplemental enhancement information (SEI) message maybe used to indicate when a non-anchor picture has a different view dependency than an anchor picture.

Accordingly, certain aspects of this disclosure relate to removing the anchor picture/non-anchor picture and List 0/List 1 signaling distinction of the MVC/AVC, thereby simplifying the bitstream, as well as construction of a reference picture list. For example, according to aspects of this disclosure, video decoder 30 may receive, for any view component a first view, reference view information indicating one or more reference views for predicting view components of the first view. That is, video decoder 30 may receive reference view information indicating view dependencies for anchor pictures of a view and non-anchor pictures of a view alike. The reference view information may include, for example, a view order index (indicating a decoding order of the view in an access unit) associated with each reference view, as described above.

In addition, when decoding a particular picture (of an access unit) of a particular view, video decoder 30 may include reference candidates (e.g., view components from which the particular picture can be predicted from) from the same access unit as the particular picture and from the reference views indicated by the reference view information. In some instances, video decoder 30 may add reference candidates to the reference picture list from each reference view, such that the number of reference candidates is equal to the number of reference views. In addition, video decoder 30 may add reference candidates to either List 1, List 0, or both. Video decoder 30 may then decode the particular picture based on one of the reference pictures in the reference picture list.

As still another example, as described above, a priority_id is included in the NAL unit header of an MVC/AVC compliant bitstream. The priority_id provides an indication of the priority of a particular NAL unit. More particularly, each NAL unit is conventionally assigned a priority value. In response to a request for priority value P, all NAL units having priority values less than or equal to P will be provided (that is, NAL units having priority_id values greater than P are discarded). In this manner, lower priority values specify higher priorities. It should be understood that NAL units of the same view may have different priorities, e.g., for temporal scalability within the view.

This priority may be used for purposes of scalability. For example, to retrieve video data consuming the least amount of bandwidth (at the cost of forming a relatively low quality representation), video decoder 30 (or, more generally, destination device 14) may request only the highest priority NAL units to be transmitted from a source such as source device 12/video encoder 20, and the priority_id can be used to filter out lower priority NAL units. In some examples, router 36 of server/content delivery network 34 may use the priority_id to separate relatively high priority NAL units from lower priority NAL units. To produce a relatively higher quality representation (at the cost of higher bandwidth consumption), video decoder 30 may request NAL units having a lower priority to supplement the higher priority NAL units, e.g., by specifying a higher priority value.

According to aspects of this disclosure, rather than signaling the priority_id in the NAL unit header, video encoder 20 may provide priority_id values in an SPS. That is, a priority_id for each view with a certain temporal level may be signaled in the sequence level. In addition, according to aspects of this disclosure, single pass adaption may be enabled as long as the signaling context associated with the adaptation is known.

As discussed above, in some examples, router 36, which may be responsible for forwarding the bitstream to destination device 14, may use the SPS priority_id values to filter certain views. That is, router 36 may receive the full bitstream, but extract a sub-bitstream including NAL units having priority_id values at and below a priority value specified by destination device 14, and forward the sub-bitstream to destination device.

In still another example, according to MVC/AVC, single-pass adaptation requires a 6-bit priority_id in the NAL unit header. For example, as noted above, an MVC/AVC SPS may include a view level indication for view scalability. That is, each view of an MVC bitstream may coded in a hierarchical manner and be assigned a numerical view level.

According to aspects of this disclosure, an SPS may include the view level information. Thus, when destination device 14 requests views of view level V from server/content delivery network 34, destination device 14 receives all views having view levels less than or equal to V. Similar to the use of priority_id values described above, router 36 of server/content delivery network 34 may use the view levels to extract a sub-bitstream including data for views having view levels less than or equal to a client-requested view level.

Other aspects of this disclosure relate to a lightweight transcoding process to convert a sub-bitstream of a higher profile to a bitstream conforming to a lower profile. Such a transcoding process may be performed, for example, by server/content delivery network 34. According to aspects of this disclosure, transcoding may be performed in the following to steps:

1) Remapping view_idx and view_id values in the SPS
2) Resizing the NAL unit header with a short length view_idx Assume, for example, that a free-viewpoint television (FVT) profile bitstream contains 32 views, with view_idx equal to view_id for each view. In this example, the bitstream has a sub-bitstream containing 8 views, with view_idx equal to 0, 4, 8, 12, 16, 20, 24, 28. This sub-bitstream further contains a sub-bitstream that contains two views, with view_id values 0 and 4.

According to aspects of this disclosure, the view_idx values for the 8-view sub-bitstream may be remapped according to Table 3 below:

TABLE 3

VIEW_IDX REMAPPING

| view_id | 0 | 4 | 8 | 12 | 16 | 20 | 24 | 28 |
|---|---|---|---|---|---|---|---|---|
| Original view_idx in the ftv profile | 0 | 4 | 8 | 12 | 16 | 20 | 24 | 28 |
| Mapped view_idx in the 3DV profile | 0 | 1 | 2 | 3 | 4 | 5 | 6 | 7 |

According to aspects of this disclosure, the view_idx values for the 2-view sub-bitstream may be remapped according to Table 4 below:

TABLE 4

VIEW_IDX REMAPPING

| view_id | 0 | 4 |
|---|---|---|
| Original view_idx in the ftv profile | 0 | 4 |
| Mapped view_idx in the 3DV profile | 0 | 1 |
| Mapped view_idx in the stereo profile | 0 | 1 |

According to aspects of this disclosure, a view_idx in a NAL unit header may be remapped according to Table 5 below:

TABLE 5

VIEW_IDX REMAPPING

| | Number of bits in the NALU | Value for view_id 4 |
|---|---|---|
| view_idx in ftv NAL unit header | u(10) | 4 |
| view_idx in 3DV NAL unit header | u(3) | 1 |
| view_idx in the stereo NAL unit header | No bit needs to be signaled | 1 |

Alternatively, the lightweight transcoding process described above may not require the remapping of view_idx if a conforming bitstream allows a gap in the view order index.

Figure 2:
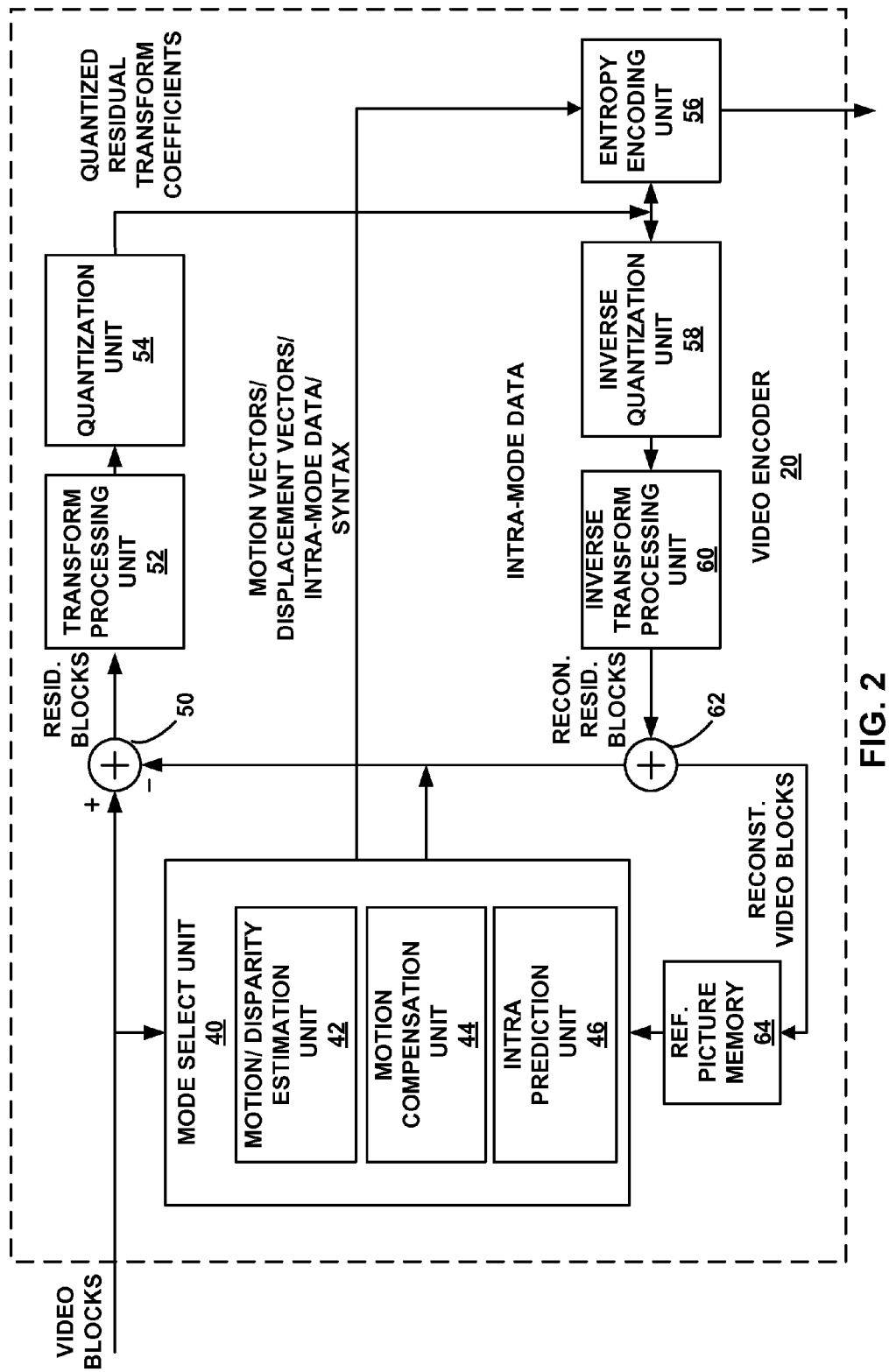
FIG. 2 is a block diagram illustrating an example video encoder that may implement the techniques described in this disclosure.

FIG. 2 is a block diagram illustrating an example video encoder 20 that may implement the techniques described in this disclosure for encoding a multiview bitstream. Video encoder 20 receives video data to be encoded. In the example of FIG. 2, video encoder 20 includes a mode select unit 40, summer 50, transform processing unit 52, quantization unit 54, entropy encoding unit 56, and reference picture memory 64. Mode select unit 40, in turn, includes motion/disparity estimation unit 42, motion compensation unit 44, intra prediction unit 46, and partition unit 48.

For video block reconstruction, video encoder 20 also includes inverse quantization unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter. Such filters are not shown for brevity, but if desired, may filter the output of summer 50 (as an in-loop filter).

Mode select unit 40 may receive raw video data in the form of blocks from one or more views. Mode select unit 40 may select one of the coding modes, intra or inter, e.g., based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy encoding unit 56.

Motion/disparity estimation unit 42 and motion compensation unit 44 may be highly integrated, but are illustrated separately for conceptual purposes. Motion estimation, performed by motion/disparity estimation unit 42, is the process of generating motion vectors, which estimate motion for video blocks. A motion vector, for example, may indicate the displacement of a PU of a video block within a current picture relative to a predictive block within a reference picture (or other coded unit) relative to the current block being coded within the current picture (or other coded unit).

A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64, which may also be referred to as a reference picture buffer. For example, video encoder 20 may interpolate values of one-quarter pixel positions, one-eighth pixel positions, or other fractional pixel positions of the reference picture. Therefore, motion/disparity estimation unit 42 may perform a motion search relative to the full pixel positions and fractional pixel positions and output a motion vector with fractional pixel precision.

Motion/disparity estimation unit 42 calculates a motion vectors for a PU of a video block in an inter-coded slice by comparing the position of the PU to the position of a predictive block of a reference picture. Motion estimation/disparity unit 42 may also be configured to perform inter-view prediction, in which case motion estimation/disparity unit 42 may calculate displacement vectors between blocks of one view picture (e.g., view 0) and corresponding blocks of a reference view picture (e.g., view 1). In general, data for a motion/disparity vector may include a reference picture list, an index into the reference picture list (ref_idx), a horizontal component, and a vertical component. The reference picture may be selected from a first reference picture list (List 0), a second reference picture list (List 1), or a combined reference picture list (List C), each of which identify one or more reference pictures stored in reference picture memory 64. With respect to the combined list, video encoder 20 alternately select entries from two lists (i.e., List 0 and List 1) to be inserted (appended) into the combined list. When an entry is already put in the combined list, by checking the POC number, video encoder 20 may not insert the entry again. For each list (i.e., List 0 or List 1), video encoder 20 may select the entries based on ascending order of the reference index.

Motion/disparity estimation unit 42 may generate and send a motion/disparity vector that identifies the predictive block of the reference picture to entropy encoding unit 56 and motion compensation unit 44. That is, motion/disparity estimation unit 42 may generate and send motion vector data that identifies the reference picture list containing the predictive block, an index into the reference picture list identifying the picture of the predictive block, and a horizontal and vertical component to locate the predictive block within the identified picture.

Motion compensation, performed by motion compensation unit 44, may involve fetching or generating the predictive block based on the motion/disparity vector determined by motion/disparity estimation unit 42. Again, motion/disparity estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists.

Summer 50 forms a residual video block by subtracting pixel values of the predictive block from the pixel values of the current video block being coded, forming pixel difference values, as discussed below. In general, motion/disparity estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion/disparity estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion/disparity estimation unit 42 and motion compensation unit 44 as a reference block to inter-code a block in a subsequent picture.

Video encoder 20 may generate a number of syntax elements, as described above, which may be encoded by entropy encoding unit 56 or another encoding unit of video encoder 20. In some examples, video encoder 20 may generate and encode syntax elements for an MVC bitstream, as described above.

As noted above, a view identifier may be included in a NAL unit header to identify the view to which a NAL unit belongs. The view id may substantially increase the number of bits for the NAL unit header, which occupies a relatively large portion of the bitstream. According to aspects of this disclosure, video encoder 20 may signal a view order index as part of a NAL unit header. That is, video encoder 20 may replace the view id that may commonly be signaled in the NAL unit header with a view order index. The view order index may describe the decoding order of a corresponding view component of an access unit. The view order index can be used with a POC value or a frame value to identify a view component of a bitstream. Video encoder 20 may also generate an SPS that provides an indication of a relationship between view ids for the views and view order indexes for the views. For example, video encoder 20 may generate a mapping table that maps view_id values to view order index values and include such a mapping table in an SPS. In other examples, video encoder 20 may indicate the relationship between view ids and view order indexes in an alternative manner.

Video encoder 20 may also avoid encoding a prefix NAL unit, which may typically be included immediately prior to a base view. Rather, video encoder 20 may signal a temporal_id in a NAL unit header, which may provide all of the information needed for video decoder 30 to associate a particular view component with a particular view and with an appropriate temporal location (e.g., given a default base view order index of zero). In some examples, video encoder 20 may add a flag to the NAL unit header of the base view to indicate whether the view component (of that particular NAL unit) may be used to inter-predict view components of other views of the bitstream.

According to aspects of this disclosure, video encoder 20 may signal view dependencies for each view commonly for all view components, regardless of whether the view components are for anchor pictures and non-anchor pictures and whether the view components belong to List 0 or List 1. In some examples, video encoder 20 may include an indication in an SPS that identifies different view dependencies for anchor pictures and non-anchor pictures.

According to other aspects of this disclosure, rather than signaling the priority_id in the NAL unit header, video encoder 20 may provide priority_id values in an SPS. That is, a priority_id for each view with a certain temporal level may be signaled in the sequence level. In addition, according to aspects of this disclosure, single pass adaption may be enabled as long as the signaling context associated with the adaptation is known. In addition, video encoder 20 may signal view level information in an SPS.

Figure 3:
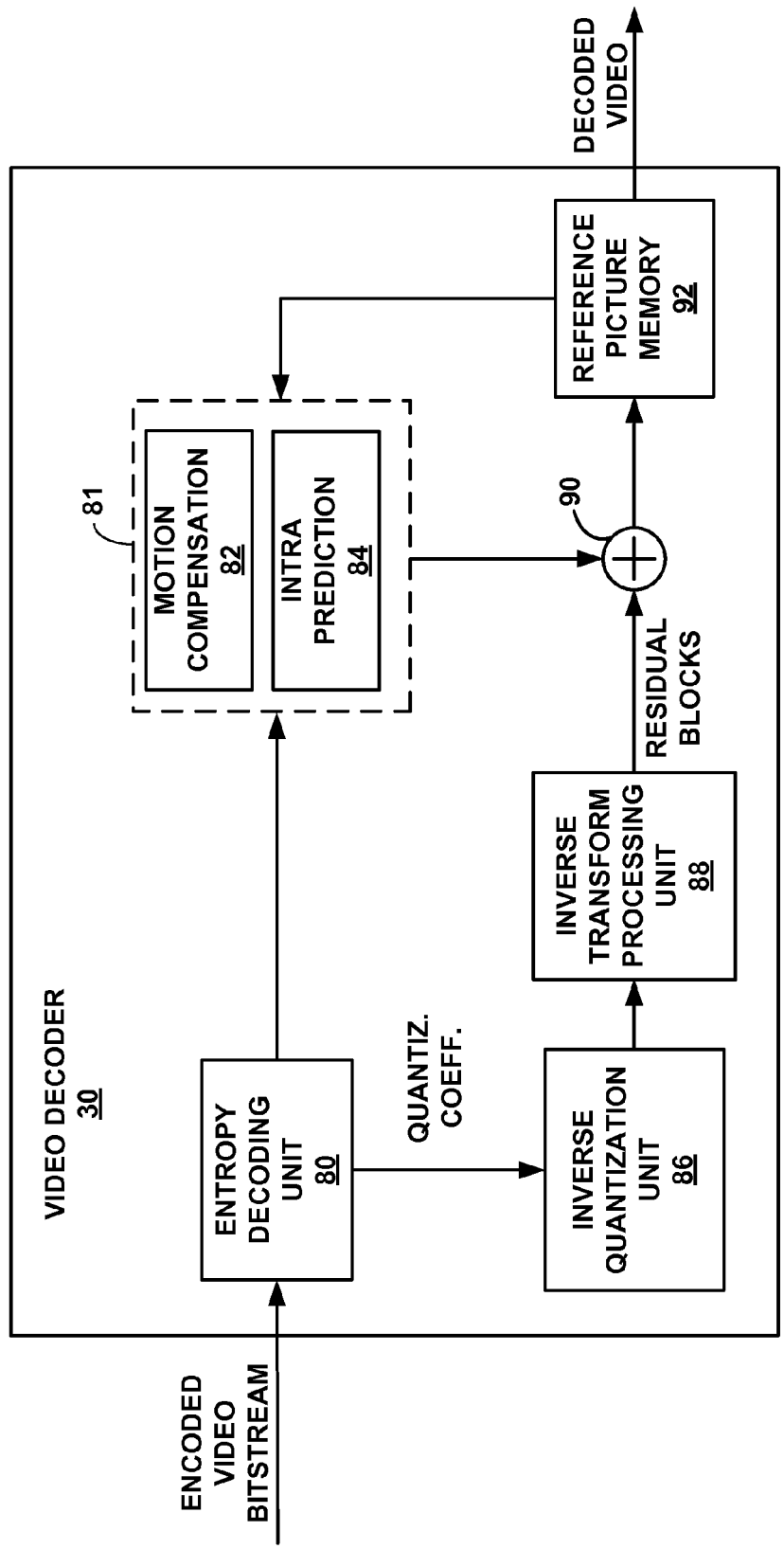
FIG. 3 is a block diagram illustrating an example video decoder that may implement the techniques described in this disclosure.

FIG. 3 is a block diagram illustrating an example video decoder 30 that may implement the techniques described in this disclosure for decoding a multiview bitstream. In the example of FIG. 3, video decoder 30 includes an entropy decoding unit 80, prediction unit 81 having motion compensation unit 82 and intra prediction unit 84, inverse quantization unit 86, inverse transformation unit 88, summer 90, and reference picture memory 92.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction unit 81. Video decoder 30 may receive the syntax elements at the video slice level and/or the video block level.

For example, video decoder 30 may receive a number of NAL units having a NAL unit header that identifies a type of data stored to the NAL unit (e.g., VCL data and non-VCL data). Parameter sets may contain the sequence-level header information, such as an SPS, PPS, or other parameter set described above.

According to aspects of this disclosure, video decoder 30 may receive a view order index as part of a NAL unit header. That is, video decoder 30 may receive a view order index rather than the view id that may commonly be signaled in the NAL unit header. The view order index may describe the decoding order of a corresponding view component of an access unit. In addition, video decoder 30 may receive information indicative of the relationship between a received view order index and a corresponding view id. The information may include, for example, a mapping table that maps view_id values to view order index values. In this manner, video decoder 30 may simply receive a view order index value in a NAL unit header and determine the view_id of the NAL unit using the mapping table. In some examples, the relationship information may be received in an SPS. Video decoder 30 may also use the view order index with a POC value or a frame value (frame number or frame_num) to identify a view component of a bitstream.

In some examples, according to aspects of this disclosure, video decoder 30 may not receive a prefix NAL unit, which may typically be included immediately prior to a base view. Rather, video decoder 30 may receive a temporal_id in a NAL unit header, which may provide all of the information needed for video decoder 30 to associate a particular view component with a particular view and with an appropriate temporal location (e.g., given a default base view order index of zero). In some examples, video decoder 30 may receive a flag in the NAL unit header of the base view to indicate whether the view component (of that particular NAL unit) may be used to inter-predict view components of other views of the bitstream.

According to aspects of this disclosure, video decoder 30 may also receive view dependencies for each view commonly for all view components, regardless of whether the view components are for anchor pictures and non-anchor pictures, and regardless of whether the view component will be included in List 0 or List 1. In some examples, video decoder 30 may receive an indication in an SPS that identifies different view dependencies for anchor pictures and non-anchor pictures.

According to other aspects of this disclosure, rather than signaling the priority_id in the NAL unit header, video encoder 20 may provide priority_id values in an SPS. In addition, according to aspects of this disclosure, single pass adaption may be enabled as long as the signaling context associated with the adaptation is known. Video decoder 30 may also receive certain view level information in an SPS.

When the video slice is coded as an intra-coded (I) slice, intra prediction unit 84 of prediction unit 81 may generate prediction data for a video block of the current video slice based on a signaled intra prediction mode and data from previously decoded blocks of the current picture. When the picture is coded as an inter-coded (i.e., B, P or GPB) slice, motion compensation unit 82 of prediction unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference picture lists, List 0 and List 1 (or a combined list, List c) using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Inverse quantization unit 86 inverse quantizes, i.e., dequantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied.

Inverse transform processing unit 88 applies an inverse transform, e.g., an inverse DCT, an inverse integer transform, or a conceptually similar inverse transform process, to the transform coefficients in order to produce residual blocks in the pixel domain. According to the aspects of this disclosure, inverse transform processing unit 88 may determine the manner in which transforms were applied to residual data. That is, for example, inverse transform processing unit 88 may determine an RQT that represents the manner in which transforms (e.g., DCT, integer transform, wavelet transform, or one or more other transforms) were applied to the residual luma samples and the residual chroma samples associated with a block of received video data.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given picture are then stored in reference picture memory 92, which stores reference pictures used for subsequent motion compensation. Reference picture memory 92 also stores decoded video for later presentation on a display device, such as display device 32 of FIG. 1.

Figure 4:
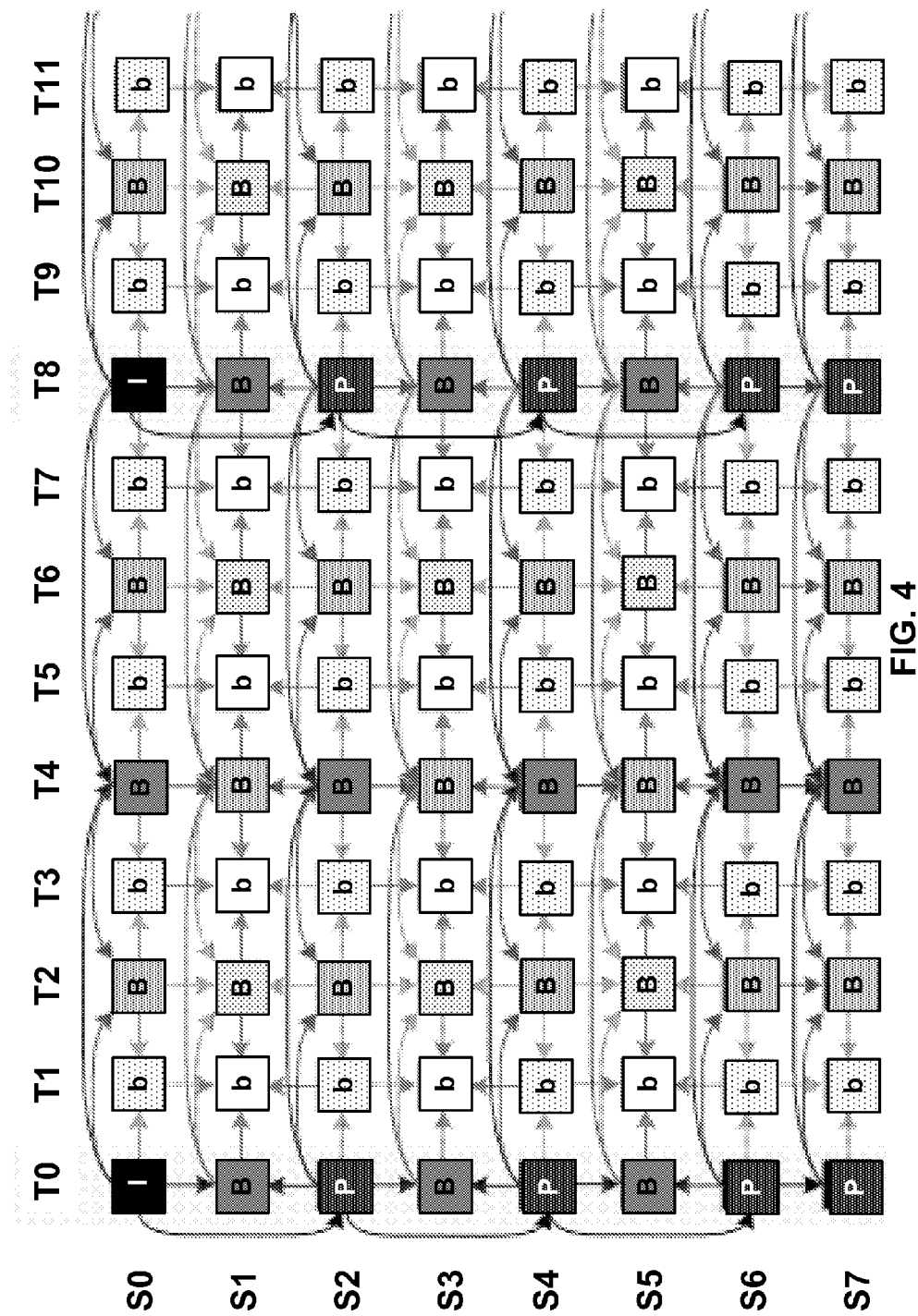
FIG. 4 is a conceptual diagram illustrating an example Multiview Video Coding (MVC) prediction pattern.

FIG. 4 is a conceptual diagram illustrating an example MVC prediction pattern. In the example of FIG. 4, eight views are illustrated, and twelve temporal locations are illustrated for each view. In general, each row in FIG. 4 corresponds to a view, while each column indicates a temporal location. Each of the views may be identified using a view identifier ("view_id"), which may be used to indicate a relative camera location with respect to the other views. In the example shown in FIG. 4, the view IDs are indicated as "S0" through "S7", although numeric view IDs may also be used. In addition, each of the temporal locations may be identified using a picture order count (POC) value, which indicates a display order of the pictures. In the example shown in FIG. 4, the POC values are indicated as "T0" through "T11."

Although MVC has a so-called base view which is decodable by H.264/AVC decoders and stereo view pair can be supported by MVC, MVC may support more than two views as a 3D video input. Accordingly, a renderer of a client having an MVC decoder may expect 3D video content with multiple views.

Pictures in FIG. 4 are indicated using a shaded block including a letter, designating whether the corresponding picture is intra-coded (that is, an I-frame), or inter-coded in one direction (that is, as a P-frame) or in multiple directions (that is, as a B-frame). In general, predictions are indicated by arrows, where the pointed-to picture uses the point-from object for prediction reference. For example, the P-frame of view S2 at temporal location T0 is predicted from the I-frame of view S0 at temporal location T0. Each of the pictures shown in FIG. 4 may be referred to as a view component. That is, a view component of a view corresponds to particular temporal instance of the view.

As with single view video encoding, pictures of a multi-view video sequence may be predictively encoded with respect to pictures at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, pictures may be inter-view predicted. That is, a view component can use the view components in other views for reference. In MVC, for example, inter-view prediction is realized as if the view component in another view is an inter-prediction reference. The potential inter-view references may be signaled in the SPS MVC extension and may be modified by the reference picture list construction process, which enables flexible ordering of the inter-prediction or inter-view prediction references.

FIG. 4 provides various examples of inter-view prediction. Pictures of view S1, in the example of FIG. 4, are illustrated as being predicted from pictures at different temporal locations of view S1, as well as inter-view predicted from pictures of pictures of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 4, capital "B" and lowercase "b" are intended to indicate different hierarchical relationships between pictures, rather than different encoding methodologies. In general, capital "B" frames are relatively higher in the prediction hierarchy than lowercase "b" frames. FIG. 4 also illustrates variations in the prediction hierarchy using different levels of shading, where a greater amount of shading (that is, relatively darker) pictures are higher in the prediction hierarchy than those pictures having less shading (that is, relatively lighter). For example, all I-frames in FIG. 4 are illustrated with full shading, while P-frames have a somewhat lighter shading, and B-frames (and lowercase b-frames) have various levels of shading relative to each other, but always lighter than the shading of the P-frames and the I-frames.

In general, the prediction hierarchy is related to view order indexes, in that pictures relatively higher in the prediction hierarchy should be decoded before decoding pictures that are relatively lower in the hierarchy, such that those pictures relatively higher in the hierarchy can be used as reference pictures during decoding of the pictures relatively lower in the hierarchy. A view order index is an index that indicates the decoding order of view components in an access unit. The view order indices may be implied in a parameter set, such as an SPS.

In this manner, pictures used as reference pictures may be decoded before decoding the pictures that are encoded with reference to the reference pictures. A view order index is an index that indicates the decoding order of view components in an access unit. According to MVC/AVC, for each view order index i, the corresponding view_id is signaled. The decoding of the view components follows the ascending order of the view order indexes. If all the views are presented, then the set of view order indexes comprises a consecutively ordered set from zero to one less than the full number of views.

In some instances, a subset of a whole bitstream can be extracted to form a sub-bitstream which still conforms to MVC. There are many possible sub-bitstreams that specific applications may require, based on, for example, a service provided by a server, the capacity, support, and capabilities of decoders of one or more clients, and/or the preference of one or more clients. For example, a client might require only three views, and there might be two scenarios. In one example, one client may require smooth viewing experience and might prefer views with view_id values S0, S1, and S2, while another other client may require view scalability and prefer views with view_id values S0, S2, and S4. Both of these sub-bitstreams can be decoded as independent MVC bitstreams and can be supported simultaneously.

In general, camera position, orientation, and geometrical relation between different views can be inferred from View ID or View Order Index. For this purpose, both intrinsic and extrinsic camera parameters may be included in the bitstream using a Multiview Acquisition Information SEI message.

While FIG. 4 shows eight views (S0-S7), as noted above, the MVC/AVC extension supports up to 1024 views and uses a view_id in a NAL unit header to identify the view to which a NAL unit belongs. According to aspects of this disclosure, a view order index may be signaled as part of a NAL unit header. That is, for purposes of comparison, a view order index may replace the view_id that is signaled in the NAL unit header of the MVC/AVC extension. View order generally describes the ordering of the views in an access unit, and a view order index identifies a particular view in view order of the access unit. That is, a view order index describes the decoding order of a corresponding view component of an access unit.

Accordingly, according to aspects of this disclosure, an SPS may provide a relationship between view_ids for the views and view order indexes for the views. Using the view order index and the data in the SPS, video encoder 20 and video decoder 30 may replace the 10 bit view_id of MVC/AVC in the NAL unit header by the view order index, which may lead to a bit savings over the MVC/AVC scheme.

An example SPS that provides a relationship between view_ids for the views and view order indexes is provided in Table 6 below:

TABLE 6

SEQUENCE PARAMETER SET MVC EXTENSION

| seq_parameter_set_mvc_extension( ) { | C | Descriptor |
|---|---|---|
|   num_views_minus1 | 0 | ue(v) |
|   for( i = 0; i <= num_views_minus1; i++ ) { | | |
|     view_id[ i ] | 0 | ue(v) |
|     *view_level[i]* | 0 | ue(v) |
|   } | | |
|   *for(i = 1; i <= num views minus1; i++) {* | | |
|     *num_ref_views[i]* | 0 | ue(v) |
|     *for(j = 0; j < num_ref_views[i]; j++)* | | |
|       *ref_view_idx[i][j]* | 0 | ue(v) |
|   } | | |
|   num_level_values_signalled_minus1 | 0 | ue(v) |
|   for( i = 0; | | |
|   i <= num_level_values_signalled_minus1; i++ ) { | | |
|     level_idc[ i ] | 0 | u(8) |
|     num_applicable_ops_minus1[ i ] | 0 | ue(v) |
|     for( j = 0; j <= num_applicable_ops_minus1[ i ]; j++ ) { | | |
|       applicable_op_temporal_id[ i ][ j ] | 0 | u(3) |
|       applicable_op_num_target_views_minus1-[ i ][ j ] | 0 | ue(v) |
|       for( k = 0; k <= applicable_op_num_target_views_minus1[ i ][ j ]; k++ ) | | |
|         *applicable_op_target_view_idx[i][j][k]* | 0 | ue(v) |
|       applicable_op_num_views_minus1[ i ][ j ] | 0 | ue(v) |
|     } | | |
|   } | | |
| } | | |

In the example shown in Table 6, the bold and italicized syntax elements indicate departures from MVC/AVC SPS syntax, that is, modifications relative to the MVC/AVC SPS syntax. For example, the SPS shown in Table 6 specifies inter-view dependency relationships for a coded video sequence. The SPS also specifies level values for a subset of the operation points for the coded video sequence. All SPSs that are referred to by a coded video sequence should be identical. However, some views identified by view_id[i] may not be present in the coded video sequence. In addition, some views or temporal subsets described by the SPS may have been removed from the original coded video sequence, and thus may not be present in the coded video sequence. The information in the SPS, however, may always apply to the remaining views and temporal subsets.

In Table 6 above, the num_views_minus1 plus 1 element may specify the maximum number of coded views in the coded video sequence. The value of num_view_minus1 may be in the range of 0 to 31, inclusive. In some instances, the actual number of views in the coded video sequence may be less than num_views_minus1 plus 1. The view_id[i] element may specify the view identifier of the view with a view order index equal to i. The view_level[i] element may specify the view_level of the view with a view order index equal to i. In some examples, all view components with a view_level up to a predefined value (VL) may be decodable without decoding any view component with a view_level larger than VL.

According to aspects of this disclosure, the num_ref_views[i] element may specify the number of view components for inter-view prediction in the initial reference picture list RefPicList0 and RefPicList1 when decoding view components with view order index equal to i. The value of the num_ref_views[i] element may not be greater than Min(15, num_views_minus1). The value of num_ref_views[0] may be equal to 0. In addition, according to aspects of this disclosure, the ref_view_idx[i][j] element may specify the view order index of the j-th view component for inter-view prediction in the initial reference picture list RefPicList0 and RefPicList1 when decoding a view component with view order index equal to i. The value of ref_view_idx[i][j] may be in the range of 0 to 31, inclusive.

Accordingly, in various aspects of this disclosure, view dependencies for anchor pictures and non-anchor pictures may no longer be required to be separately maintained and signaled. That is, video encoder 20 and/or video encoder 30 may use a single reference picture list (or maintain two reference picture lists, List 0 and List 1) for anchor pictures and non-anchor pictures alike. In this way, as shown in Table 6 above, separate signaling is not required to indicate a view dependency to video decoder 30. Rather, the SPS includes ref_view_idx, which may be used to construct both List 0 and List 1 for view components.

According to such aspects of this disclosure, for example, video decoder 30 may receive, for any view component a first view, reference view information indicating one or more reference views for predicting view components of the first view. That is, video decoder 30 may receive reference view information indicating view dependencies for anchor pictures of a view and non-anchor pictures of a view alike. When decoding a particular picture (of an access unit) of a particular view, then, video decoder 30 may include reference candidates (e.g., view components from which the particular picture can be predicted from) from the same access unit as the particular picture and from the reference views indicated by the reference view information. In some instances, video decoder 30 may add reference candidates to the reference picture list from each reference view, such that the number of reference candidates is equal to the number of reference views. In addition, video decoder 30 may add reference candidates to either List 1, List 0, or both. Video decoder 30 may then decode the particular picture based on one of the reference pictures in the reference picture list.

Moreover, according to Table 6, the inter-view dependency for non-anchor view components may no longer be signaled in an SPS as a subset of inter-view dependency for anchor view components. Rather, a view component of an anchor view may be predicted from more than one other view, such as view 3 and 4, and a non-anchor view may also be predicted from pictures of view 3 and view 4. If an additional restriction view dependency restriction is desired for non-anchor pictures, such a restriction may be provided in supplemental signaling, such as an SEI message.

The num_level_values_signalled_minus1 plus 1 element may specify the number of level values signalled for the coded video sequence. The value of the num_level_values_signalled_minus1 may be in the range of 0 to 63, inclusive. The level_idc[i] element may specify the i-th level value signalled for the coded video sequence. The num_applicable_ops_minus1[i] plus 1 element may specify the number of operation points to which the level indicated by level_idc[i] applies. The value of the num_applicable_ops_minus1[i] element may be in the range of 0 to 1023, inclusive. The applicable_op_temporal_id[i][j] element may specify the temporal_id of the j-th operation point to which the level indicated by level_idc[i] applies. The applicable_op_num_target_views_minus1[i][j] plus 1 element may specify the number of target output views for the j-th operation point to which the level indicated by level_idc[i] applies. The value of the applicable_op_num_target_views_minus1[i][j] element may be in the range of 0 to 1023, inclusive.

The applicable_op_target_view_idx[i][j][k] element may specify the view order index of the k-th target output view for the j-th operation point to which the level indicated by level_idc[i] applies. The value of the applicable_op_target_view_idx[i][j][k] element may be in the range of 0 to 31, inclusive. The applicable_op_num_views_minus1[i][j] plus 1 may specify the number of views required for decoding the target output views corresponding to the j-th operation point to which the level indicated by level_idc[i] applies. The number of views specified by the applicable_op_num_views_minus1 may include the target output views and the views that the target output views depend on as specified by a sub-bitstream extraction process.

In another example, according to aspects of this disclosure, the value of ref_view_idx[i][j] may be required to be smaller than i, based on a decoding order of the view components in the same time instance.

The ref_view_idx[i][j] may be further reduced in size (for additional bit savings versus MVC/AVC). For example, an additional bit savings may be achieved in an MVC stream that includes only two views (that is, for stereo video). In this example, a view order index may not be needed, as video decoder 30 may always decode a first view (e.g., view 0) prior to decoding a second view (e.g., view 1). An example reduced SPS is provided in Table 7 below:

TABLE 7

SEQUENCE PARAMETER SET MVC EXTENSION

| seq_parameter_set_mvc_extension( ) { | Descriptor |
|---|---|
| ... | ue(v) |
| for(i = 1; i <= num_views_minus1; i++) { | |
|   num_ref_views[i] | ue(v) |
|   for(j = 0; j < num_ref_views[i]; j++) | |

TABLE 7-continued

SEQUENCE PARAMETER SET MVC EXTENSION

| seq_parameter_set_mvc_extension( ) { | Descriptor |
|---|---|
|     ref_view_idx_diff_minus1[i][j] | ue(v) |
| ... | |

In the example shown in Table 7, the ref_view_idx_diff_minus1[i][j] plus i+1 element may specify the view order index of the j-th view component for inter-view prediction in the initial reference picture list RefPicList0 and RefPicList1 when decoding a view component with view order index equal to i. The value of the ref_view_idx_diff_minus1[i][j] element may be in the range of 0 to 30-i, inclusive.

Other examples are also possible. For example, rather than signaling view dependency in an SPS (such as the examples shown in Tables 6 and 7 above), view dependency may be signaled in a PPS. In another example, the view dependency may be signaled in the SPS, and a view dependency may be further signaled in a PPS that is inside the scope of the view dependency signaled in the sequence parameter set. For example, in an SPS, a dependent view (e.g., view 2) may be signaled as being dependent on view 0 and view 1, while in a PPS, the dependent view (e.g., view 2) may be signaled as only being dependent on view 0.

According to some aspects of this disclosure, reference picture list construction and reordering may be altered from MVC/AVC. For example, according to aspects of this disclosure, a the view index (view_idx) described above may be used during reference picture list construction and/or reordering. An example reference picture list MVC modification syntax is provided in Tables 8 and 9 below:

TABLE 8

MVC REFERENCE PICTURE LIST MODIFICATION

| ref_pic_list_mvc_modification( ) { | C | Descriptor |
|---|---|---|
|   if( slice_type % 5 != 2 && slice_type % 5 != 4 ) { | | |
|     ref_pic_list_modification_flag_l0 | 2 | u(1) |
|     if( ref_pic_list_modification_flag_l0 ) | | |
|       do { | | |
|         modification_of_pic_nums_idc | 2 | ue(v) |
|         if( modification_of_pic_nums_idc = = 0 \|\| | | |
|           modification_of_pic_nums_idc = = 1 ) | | |
|           abs_diff_pic_num_minus1 | 2 | ue(v) |
|         else if( modification_of_pic_nums_idc = = 2 ) | | |
|           long_term_pic_num | 2 | ue(v) |
|         else if ( modification_of_pic_nums_idc = = 4 \|\| modification_of_pic_nums_idc = = 5 ) | | |
|           abs_diff_view_idx_minus1 | 2 | ue(v) |
|       } while( modification_of_pic_nums_idc != 3 ) | | |
|   } | | |
|   if( slice_type % 5 = = 1 ) { | | |
|     ref_pic_list_modification_flag_l1 | 2 | u(1) |
|     if( ref_pic_list_modification_flag_l1 ) | | |
|       do { | | |
|         modification_of_pic_nums_idc | 2 | ue(v) |
|         if( modification_of_pic_nums_idc = = 0 \|\| | | |
|           modification_of_pic_nums_idc = = 1 ) | | |
|           abs_diff_pic_num_minus1 | 2 | ue(v) |
|         else if( modification_of_pic_nums_idc = = 2 ) | | |
|           long_term_pic_num | 2 | ue(v) |
|         else if ( modification_of_pic_nums_idc = = 4 \|\| modification_of_pic_nums_idc = = 5 ) | | |

TABLE 8-continued

MVC REFERENCE PICTURE LIST MODIFICATION

| ref_pic_list_mvc_modification( ) { | C | Descriptor |
|---|---|---|
|         abs_diff_inter_view_minus1 | 2 | ue(v) |
|     } while( modification_of_pic_nums_idc != 3 ) | | |
|   } | | |
| } | | |

TABLE 9

MVC REFERENCE PICTURE LIST MODIFICATION

| modification_of_pic_nums_idc | Modification specified |
|---|---|
| 4 | abs_diff_inter_view_minus1 is present and corresponds to a difference to subtract from a prediction value of the inter-view reference index |
| 5 | abs_diff_inter_view_minus1 is present and corresponds to a difference to add to a prediction value of the inter-view reference index |

In Tables 8 and 9, the modification_of_pic_nums_idc element together with abs_diff_pic_num_minus1, long_term_pic_num, or abs_diff_view_idx_minus1 may specify which of the reference pictures or inter-view only reference components are remapped. For example, the abs_diff_view_idx_minus1 plus 1 element may specify the absolute difference between the inter-view reference index to put to the current index in the reference picture list and the prediction value of the inter-view reference index.

In another example, according to aspects of this disclosure, the inter_view_index of an inter-view reference may be directly signalled. Such a reference picture list MVC modification syntax is provided in Tables 10 and 11 below:

TABLE 10

MVC REFERENCE PICTURE LIST MODIFICATION

| ref_pic_list_mvc_modification( ) { | C | Descriptor |
|---|---|---|
| if( slice_type % 5 != 2 && slice_type % 5 != 4 ) { | | |
|   ref_pic_list_modification_flag_l0 | 2 | u(1) |
|   if( ref_pic_list_modification_flag_l0 ) | | |
|     do { | | |
|       modification_of_pic_nums_idc | 2 | ue(v) |
|       if( modification_of_pic_nums_idc = = 0 || | | |
|         modification_of_pic_nums_idc = = 1 ) | | |
|         abs_diff_pic_num_minus1 | 2 | ue(v) |
|       else if( modification_of_pic_nums_idc = = 2 ) | | |
|         long_term_pic_num | 2 | ue(v) |
|       else if ( modification_of_pic_nums_idc = = 4 ) | | |
|         *inter_view_index* | 2 | ue(v) |
|     } while( modification_of_pic_nums_idc != 3 ) | | |
| } | | |
| if( slice_type % 5 = = 1 ) { | | |
|   ref_pic_list_modification_flag_l1 | 2 | u(1) |
|   if( ref_pic_list_modification_flag_l1 ) | | |
|     do { | | |
|       modification_of_pic_nums_idc | 2 | ue(v) |
|       if( modification_of_pic_nums_idc = = 0 || | | |
|         modification_of_pic_nums_idc = = 1 ) | | |
|         abs_diff_pic_num_minus1 | 2 | ue(v) |
|       else if( modification_of_pic_nums_idc = = 2 ) | | |

TABLE 10-continued

MVC REFERENCE PICTURE LIST MODIFICATION

| ref_pic_list_mvc_modification( ) { | C | Descriptor |
|---|---|---|
|         long_term_pic_num | 2 | ue(v) |
|       else if ( modification_of_pic_nums_idc = = 4 ) | | |
|         *inter_view_index* | 2 | ue(v) |
|     } while( modification_of_pic_nums_idc != 3 ) | | |
| } | | |
| } | | |

TABLE 11

MVC REFERENCE PICTURE LIST MODIFICATION

| modification_of_pic_nums_idc | Modification specified |
|---|---|
| 4 | inter_view_index is present and corresponds to a difference to subtract from a prediction value of the inter-view reference index |

In Tables 10 and 11, an inter-view reference picture may be identified by the inter_view_index as follows:

VOIdx=ref_view_idx[CurrVOIdx][inter_view_index]

where CurrVOIdx is the view order index of the current view component. Given a POC value of the current picture, the POC and VOIdx may be used to identify an inter-view reference picture.

In some examples, the MVC decoding process for reference picture lists construction may be invoked at the beginning of the decoding process for each P, SP or B slice. During the invocation of this process, only the reference pictures having the same value of view_idx as the current slice may be considered. Decoded reference pictures may be marked as "used for short-term reference" or "used for long-term reference." Short-term reference pictures may be identified by the values of frame_num and view_idx, and, for inter-view reference pictures, additionally by PicOrderCnt( ). Long-term reference pictures may be assigned a long-term frame index and identified by the values long-term frame index, view_idx, and, for inter-view reference pictures, additionally by PicOrderCnt( ).

In addition to reference pictures, inter-view only reference components (which may be non-reference pictures and may not marked during a reference picture marking process) may also be included in a reference picture list. Inter-view only reference components may be identified by the value of view_idx and by PicOrderCnt( ).

During the invocation of the reference picture list construction process, the following process, identified in MVC/AVC as subclause 8.2.4.1, may be invoked to specify:

the assignment of variables FrameNum, FrameNumWrap, and PicNum to each of the short-term reference pictures, and the assignment of variable LongTermPicNum to each of the long-term reference pictures.

Reference pictures and, when present, inter-view only reference components, are addressed through reference indices. A reference index is an index into a reference picture list. When decoding a P or SP slice, there is a single reference picture list RefPicList0. When decoding a B slice, there is a second independent reference picture list RefPicList1 in addition to RefPicList0.

At the beginning of the decoding process for each slice, reference picture list RefPicList0, and for B slices RefPicList1, may be derived as specified by the following ordered steps:
1. The initial reference picture list RefPicList0 and for B slices RefPicList1 are derived as specified in subclause 8.2.4.2 of MVC/AVC.
2. Inter-view reference pictures or inter-view only reference components are appended to the initial reference picture list RefPicList0 and for B slices RefPicList1 as specified in subclause 6.4.1 (set forth below).
3. When ref_pic_list_modification_flag_l0 is equal to 1 or, when decoding a B slice, ref_pic_list_modification_flag_l1 is equal to 1, the reference picture list RefPicList0 and for B slices RefPicList1 are modified as specified in subclause 6.4.2 (set forth below).

In addition, the number of entries in the modified reference picture list RefPicList0 is num_ref_idx_l0_active_minus1+1, and for B slices the number of entries in the modified reference picture list, RefPicList1 is num_ref_idx_l1_active_minus1+1. A reference picture or inter-view only reference component may appear at more than one index in the modified reference picture lists RefPicList0 or RefPicList1.

During the invocation of the process specified in subclause 6.4.1, an inter-view prediction reference appended to RefPicListX (with X being 0 or 1) may not exist. However, an inter-view prediction reference that does not exist may not be in the modified RefPicListX after the invocation of the process specified in subclause 6.4.2 (set forth below).

In an example, subclause 6.4.1 is set forth below, which includes an initialization process for a reference picture list for inter-view prediction references:

Inputs to this process are a reference picture list RefPicListX (with X being 0 or 1), inter_view_flag and view dependency information that has been decoded from the seq_parameter_set_mvc_extension( ).

The output of this process is a possibly modified reference picture list RefPicListX, which is still referred to as the initial reference picture list RefPicListX.

With i being the value of view_idx for the current slice, inter-view reference pictures and inter-view only reference components are appended to the reference picture list as specified below:

For each value of inter-view reference index j from 0 to num_ref_views[i]−1, inclusive, in ascending order of j, the inter-view prediction reference with view_idx equal to ref_view_idx[i][j] from the same access unit as the current slice is appended to RefPicListX.

In an example, subclause 6.4.2 is set forth below, which includes a modification process for reference picture lists:

Input to this process is reference picture list RefPicList0 and, when decoding a B slice, also reference picture list RefPicList1.

Outputs of this process are a possibly modified reference picture list RefPicList0 and, when decoding a B slice, also a possibly modified reference picture list RefPicList1.

When ref_pic_list_modification_flag_l0 is equal to 1, the following ordered steps are specified:
1. Let refIdxL0 be an index into the reference picture list RefPicList0. It is initially set equal to 0.
2. The corresponding syntax elements modification_of_pic_nums_idc are processed in the order they occur in the bitstream. For each of these syntax elements, the following applies:

If modification_of_pic_nums_idc is equal to 0 or equal to 1, the process specified in subclause 6.4.2.1 (set forth below) is invoked with RefPicList0 and refIdxL0 given as input, and the output is assigned to RefPicList0 and refIdxL0.

Otherwise, if modification_of_pic_nums_idc is equal to 2, the process specified in subclause 6.4.2.2 (set forth below) is invoked with RefPicList0 and refIdxL0 given as input, and the output is assigned to RefPicList0 and refIdxL0.

Otherwise, if modification_of_pic_nums_idc is equal to 4 or equal to 5, the process specified in subclause 6.4.2.3 (set forth below) is invoked with RefPicList0 and refIdxL0 given as input, and the output is assigned to RefPicList0 and refIdxL0.

Otherwise (modification_of_pic_nums_idc is equal to 3), the modification process for reference picture list RefPicList0 is finished.

When ref_pic_list_modification_flag_l1 is equal to 1, the following ordered steps are specified:
1. Let refIdxL1 be an index into the reference picture list RefPicList1. It is initially set equal to 0.
2. The corresponding syntax elements modification_of_pic_nums_idc are processed in the order they occur in the bitstream. For each of these syntax elements, the following applies.

If modification_of_pic_nums_idc is equal to 0 or equal to 1, the process specified in subclause 6.4.2.1 (set forth below) is invoked with RefPicList1 and refIdxL1 given as input, and the output is assigned to RefPicList1 and refIdxL1.

Otherwise, if modification_of_pic_nums_idc is equal to 2, the process specified in subclause 6.4.2.2 (set forth below) is invoked with RefPicList1 and refIdxL1 given as input, and the output is assigned to RefPicList1 and refIdxL1.

Otherwise, if modification_of_pic_nums_idc is equal to 4 or equal to 5, the process specified in subclause 6.4.2.3 (set forth below) is invoked with RefPicList1 and refIdxL1 given as input, and the output is assigned to RefPicList1 and refIdxL1.

Otherwise (modification_of_pic_nums_idc is equal to 3), the modification process for reference picture list RefPicList1 is finished.

In an example, subclause 6.4.2.1 is set forth below, which includes a modification process of a reference picture list for short-term reference pictures for inter-prediction:

Inputs to this process are an index refIdxLX and reference picture list RefPicListX (with X being 0 or 1).

Outputs of this process are an incremented index refIdxLX and a modified reference picture list RefPicListX.

The variable picNumLXNoWrap is derived as follows:

If modification_of_pic_nums_idc is equal to 0, $$\text{if( picNumLXPred} - (\text{ abs\_diff\_pic\_num\_minus1} + 1) < 0)$$
$$\text{picNumLXNoWrap} = \text{picNumLXPred} -$$
$$(\text{ abs\_diff\_pic\_num\_minus1} + 1) + \text{MaxPicNum} \quad \text{(H-1)}$$

```
else
    picNumLXNoWrap = picNumLXPred −
    ( abs_diff_pic_num_minus1 + 1 )
```

Otherwise (modification_of_pic_nums_idc is equal to 1),

```
if( picNumLXPred + ( abs_diff_pic_num_minus1 + 1 ) >=
    MaxPicNum )
    picNumLXNoWrap = picNumLXPred +
    ( abs_diff_pic_num_minus1 + 1 ) − MaxPicNum (H-2)
else
    picNumLXNoWrap = picNumLXPred +
    ( abs_diff_pic_num_minus1 + 1 )
``` where picNumLXPred is the prediction value for the variable picNumLXNoWrap. When the process specified in this subclause is invoked the first time for a slice (that is, for the first occurrence of modification_of_pic_nums_idc equal to 0 or 1 in the ref_pic_list_modification( ) syntax), picNumL0Pred and picNumL1Pred are initially set equal to CurrPicNum. After each assignment of picNumLXNoWrap, the value of picNumLXNoWrap is assigned to picNumLXPred.

In some examples, the variable picNumLX is derived as specified by the following pseudo-code:

```
if( picNumLXNoWrap > CurrPicNum )
    picNumLX = picNumLXNoWrap − MaxPicNum (H-3)
else
    picNumLX = picNumLXNoWrap
``` where picNumLX may be equal to the PicNum of a reference picture that is marked as "used for short-term reference" and may not be equal to the PicNum of a short-term reference picture that is marked as "non-existing". The following process may be conducted to place the picture with short-term picture number picNumLX into the index position refIdxLX, shift the position of any other remaining pictures to later in the list, and increment the value of refIdxLX:

```
for( cIdx = num_ref_idx_lX_active_minus1 + 1;
cIdx > refIdxLX; cIdx−− )
    RefPicListX[ cIdx ] = RefPicListX[ cIdx − 1 ]
RefPicListX[ refIdxLX++ ] = short-term reference picture with PicNum
equal to picNumLX
nIdx = refIdxLX
for( cIdx = refIdxLX; cIdx <= num_ref_idx_lX_active_minus1 + 1;
cIdx++ ) (H-4)
    if( PicNumF( RefPicListX[ cIdx ] ) != picNumLX ||
    viewIDX (RefPicListX[cIdx] ) != currViewIDX )
        RefPicListX[ nIdx++ ] = RefPicListX[ cIdx ]
``` where the function viewIDX(refpic) returns the view_idx of the reference picture refpic, the variable currViewIDX is equal to the view_idx of the current slice, and the function PicNumF(RefPicListX[cIdx]) is derived as follows:

If the reference picture RefPicListX[cIdx] is marked as "used for short-term reference", PicNumF(RefPicListX[cIdx]) is the PicNum of the picture RefPicListX[cIdx].

Otherwise (the reference picture RefPicListX[cIdx] is not marked as "used for short-term reference"), PicNumF(RefPicListX[cIdx]) is equal to MaxPicNum.

In an example, subclause 6.4.2.2 is set forth below, which includes a modification process of a reference picture list for long-term reference pictures for inter-prediction:

Inputs to this process are an index refIdxLX (with X being 0 or 1) and reference picture list RefPicListX.

Outputs of this process are an incremented index refIdxLX and a modified reference picture list RefPicListX.

The following procedure is conducted to place the picture with long-term picture number long_term_pic_num into the index position refIdxLX, shift the position of any other remaining pictures to later in the list, and increment the value of refIdxLX:

```
for( cIdx = num_ref_idx_lX_active_minus1 + 1; cIdx > refIdxLX;
cIdx−− )
    RefPicListX[ cIdx ] = RefPicListX[ cIdx − 1 ]
RefPicListX[ refIdxLX++ ] = long-term reference picture with
LongTermPicNum equal to long_term_pic_num
nIdx = refIdxLX
for( cIdx = refIdxLX; cIdx <= num_ref_idx_lX_active_minus1 + 1;
cIdx++ ) (H-5)
    if( LongTermPicNumF( RefPicListX[ cIdx ] ) !=
    long_term_pic_num ||
    viewIDX (RefPicListX[ cIdx ] ) != currViewIDX )
        RefPicListX[ nIdx++ ] = RefPicListX[ cIdx ]
``` where the function viewIDX(refpic) returns the view_idx of the reference picture refpic, the variable currViewIDX is equal to the view_idx of the current slice, and the function LongTermPicNumF(RefPicListX[cIdx]) may be derived as follows:

If the reference picture RefPicListX[cIdx] is marked as "used for long-term reference", LongTermPicNumF(RefPicListX[cIdx]) is the LongTermPicNum of the picture RefPicListX[cIdx].

Otherwise (the reference picture RefPicListX[cIdx] is not marked as "used for long-term reference"), LongTermPicNumF(RefPicListX[cIdx]) is equal to 2*(MaxLongTermFrameIdx+1).

In an example, subclause 6.4.2.3 is set forth below, which includes a modification process of a reference picture list for inter-view prediction references:

Inputs to this process are reference picture list RefPicListX (with X being 0 or 1) and an index refIdxLX into this list.

Outputs of this process are a modified reference picture list RefPicListX (with X being 0 or 1) and an incremented index refIdxLX.

Let currVOIdx be the variable VOIdx of the current slice. The variable maxViewIdx is set equal to num_ref_views[currVOIdx].

The variable picInterViewIdxLX is derived as follows:

If modification_of_pic_nums_idc is equal to 4,

```
if(picInterViewIdxLXPred − ( abs_diff_inter_view_minus1 +
    1 ) < 0 )
    picInterViewIdxLX = picInterViewIdxLXPred − (
abs_diff_inter_view_ minus1 + 1 ) + maxViewIdx (H-6)
```

```
        else
            picInterViewIdxLX = picInterViewIdxLXPred − (
abs_diff_inter_view_minus1 + 1 )
```

Otherwise (modification_of_pic_nums_idc is equal to 5),

```
        if(picInterViewIdxLXPred + ( abs_diff_inter_view_minus1 +
1 ) >= maxViewIdx )
            picInterViewIdxLX = picInterViewIdxLXPred + (
abs_diff_inter_view_ minus1 + 1 ) − maxViewIdx (H-7)
        else
            picInterViewIdxLX = picInterViewIdxLXPred + (
abs_diff_inter_view_minus1 + 1 )
``` where picInterViewIdxLXPred is the prediction value for the variable picInterViewIdxLX. When the process specified in this subclause is invoked the first time for RefPicList0 or RefPicList1 of a slice (that is, for the first occurrence of modification_of_pic_nums_idc equal to 4 or 5 in the ref_pic_list_modification( ) syntax), picInterViewIdxL0Pred and picInterViewIdxL1Pred may initially be set equal to −1. After each assignment of picInterViewIdxLX, the value of picInterViewIdxLX is assigned to picInterViewIdxLXPred.

The bitstream may not contain data that results in picInterViewIdxLX equal to less than 0 or picInterViewIdxLX greater than maxViewIdx. The variable targetViewIDX may be derived as follows:

$$targetViewIDX = ref\_view\_idx[currVOIdx][picInterViewIdxLX] \quad (H-8)$$

The following procedure may be conducted to place the inter-view prediction reference with inter-view reference index equal to picInterViewIdxLX into the index position refIdxLX and shift the position of any other remaining pictures to later in the list:

```
for( cIdx = num_ref_idx_lX_active_minus1 + 1; cIdx > refIdxLX;
cIdx−− )
    RefPicListX[ cIdx ] = RefPicListX[ cIdx − 1]
RefPicListX[ refIdxLX++ ] = inter-view prediction reference with
view_idx equal to targetViewIDX
nIdx = refIdxLX
for( cIdx = refIdxLX; cIdx <= num_ref_idx_lX_active_minus1 + 1;
cIdx++ ) (H-10)
    if( viewIDX(RefPicListX[ cIdx ]) != targetViewIDX ||
PictureOrderCnt(RefPicListX[ cIdx ]) != currPOC )
        RefPicListX[ nIdx++ ] = RefPicListX[ cIdx ]
``` where the function viewIDX(refpic) returns the view_idx of the reference picture refpic, the variable currViewIDX is equal to the view_idx of the current slice, and the variable currPOC is equal to PicOrderCnt( ) of the current slice.

In some examples, a default process may be used to combine reference picture lists. For example, a default reference picture list combination process may include checking if a reference picture (either from RefPicList0 or RefPicList1) is the first occurrence of the reference picture that is being added into the combined list. To perform such a check, a video coder (such as video encoder 20 or video decoder 30) may compare a current picture CurrPic and any picture PicA in a list, including inter-view reference pictures and temporal reference pictures. The comparison can be done as follows:

```
if (ViewIDX(CurrPic) == ViewIDX(PicA) && POC(CurrPic) == POC
(PicA) )
    return true;
else
    return false;
```

Figure 5A:
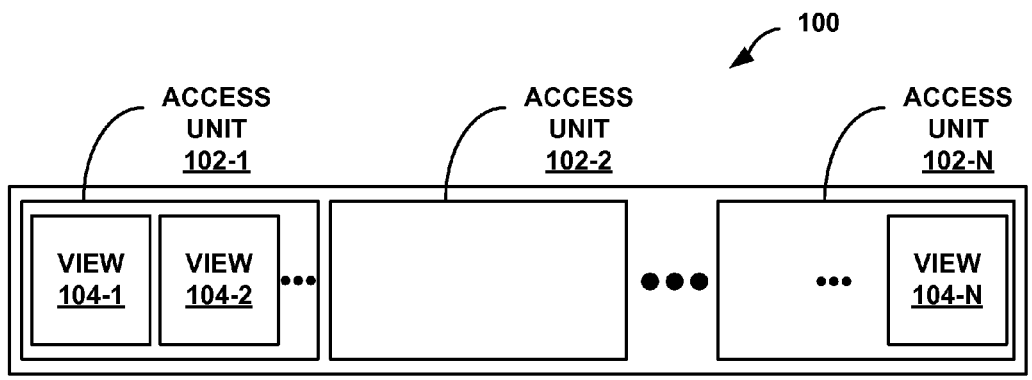
FIG. 5A is a conceptual diagram illustrating an example of a bitstream structure that may be used in an implementation of one or more of the techniques of this disclosure.

FIG. 5A is a conceptual diagram illustrating an example of a bitstream structure 100 that may be used in an implementation of one or more of the techniques of this disclosure. Bitstream 100 may comply with a video coding standard, such as the HEVC standard. Moreover, in some examples, bitstream 100 may comply with an MVC extension to a video coding standard.

In the example shown in FIG. 5A, bitstream 100 includes a plurality of access units 102-1 through 102-N (collectively, access units 102). As noted above, access units 102 may include a set of view components (referred to as views), such as views 104-1 through 104-M (collectively, views 104). In general, access units 102 include all data for a common temporal instance, e.g., data for one view component per view. In some examples, each access unit of access units 102 includes the same number of views 104. Decoding each access unit of access units 102 may result in one decoded picture per view. Access units 102 may contain encoded video data that may be used to render three-dimensional video playback.

Figure 5B:
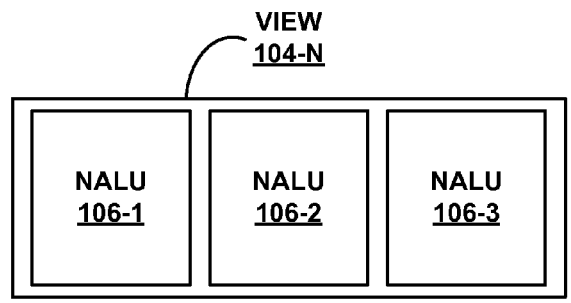
FIG. 5B is a conceptual diagram illustrating an example of a view that may be included in the bitstream structure of FIG. 5A.

FIG. 5B is a conceptual diagram illustrating an example of a view 104-N that may be included in the structure of the bitstream 100 of FIG. 5A. In general, each view component in an access unit (such as views 104 in access unit 102-N) contains a set of video encoder/decoder (codec) layer (VCL) NAL units. That is, in the example shown in FIG. 5B, view 104-N includes NAL units 106-1 through 106-3 in a specific form and order. Typically, the view components are arranged in the same order in each access unit, such that the kth view component in each access unit corresponds to the same view. In other examples, view 104-N may include other numbers of NAL units.

Figure 5C:
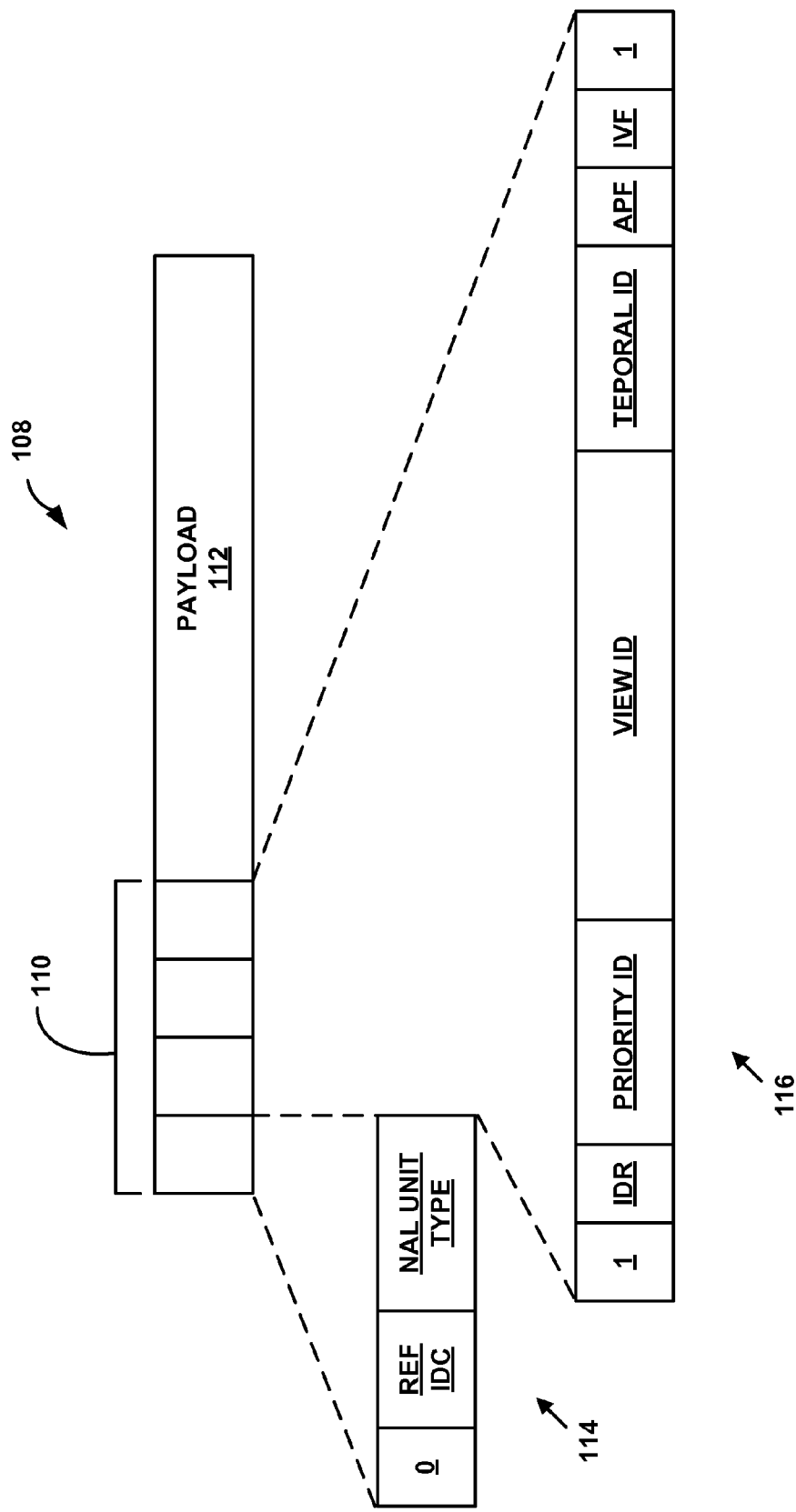
FIG. 5C is a conceptual diagram illustrating an example of a Network Abstraction Layer (NAL) unit that may be included in the bitstream structure of FIG. 5A.

FIG. 5C is a conceptual diagram illustrating an example NAL unit 108, which may be similar in structure to NAL units 106 shown in FIG. 5B. NAL unit 108 generally includes a NAL unit header 110 and payload 112. In addition, NAL unit header 110 includes a first portion 114 and a NAL unit header extension 116, which may conform to the MVC/AVC extension.

For example, first portion 114 includes a ref_idc element and a NAL unit type element. The ref_idc element may indicate whether the NAL unit is used as a reference for other NAL units. For example, a ref_idc value of 00 may indicate that the content of the NALU is not used to reconstruct stored pictures (that can be used for future reference). Such NALUs can be discarded without risking the integrity of the reference pictures. Values above 00 may indicate that the decoding of the NALU is required to maintain the integrity of the reference pictures. The NAL unit type element may indicate the type of packets of NAL unit 108.

NAL unit header extension 116 generally includes an IDR flag (IDR), a priority ID (priority_id), a view ID (view_id), a temporal ID (temporal_id), an anchor picture flag (APF), and an inter-view flag (IVF). As described with respect to FIG. 1 above, the IDR flag may indicate whether NAL unit 108 belongs to an instant decode refresh (IDR) or a view-IDR (V-IDR) picture that can be used as a closed-GOP random access point. The priority_id may be used with a bitstream adaptation process that varies the bitstream according to changing network conditions and/or capabilities of video decoder 30 and/or display device 32 (e.g., such as single-pass adaptation process). The view_id may be used to indicate the view identifier for the view to which the NAL unit belongs. The temporal_id may be used to indicate the temporal level of the current NAL unit, which may correspond to a particular frame rate. The APF may be used to indicate whether the NAL unit belongs to an anchor picture that can be used as an open-GOP random access point. The IVF may be used to indicate whether the NAL unit is used for inter-view prediction for NAL units in other views.

As discussed above, the view_id of MVC/AVC is 10 bits long, and may be used to uniquely identify over 1000 different views. Generally, however, the number of views actually encoded is typically several orders of magnitude less than 1000 views. For example, FIG. 4 includes eight views for a given MVC multimedia content. Since NAL unit header 110 is included for every NAL unit, the view_id may consume a substantial amount of the bitstream. Aspects of this disclosure, as described with respect to the example shown in FIG. 5D, may eliminate the view_id from the NAL unit header, thereby reducing the number of bits required to code MVC video data.

Figure 5D:
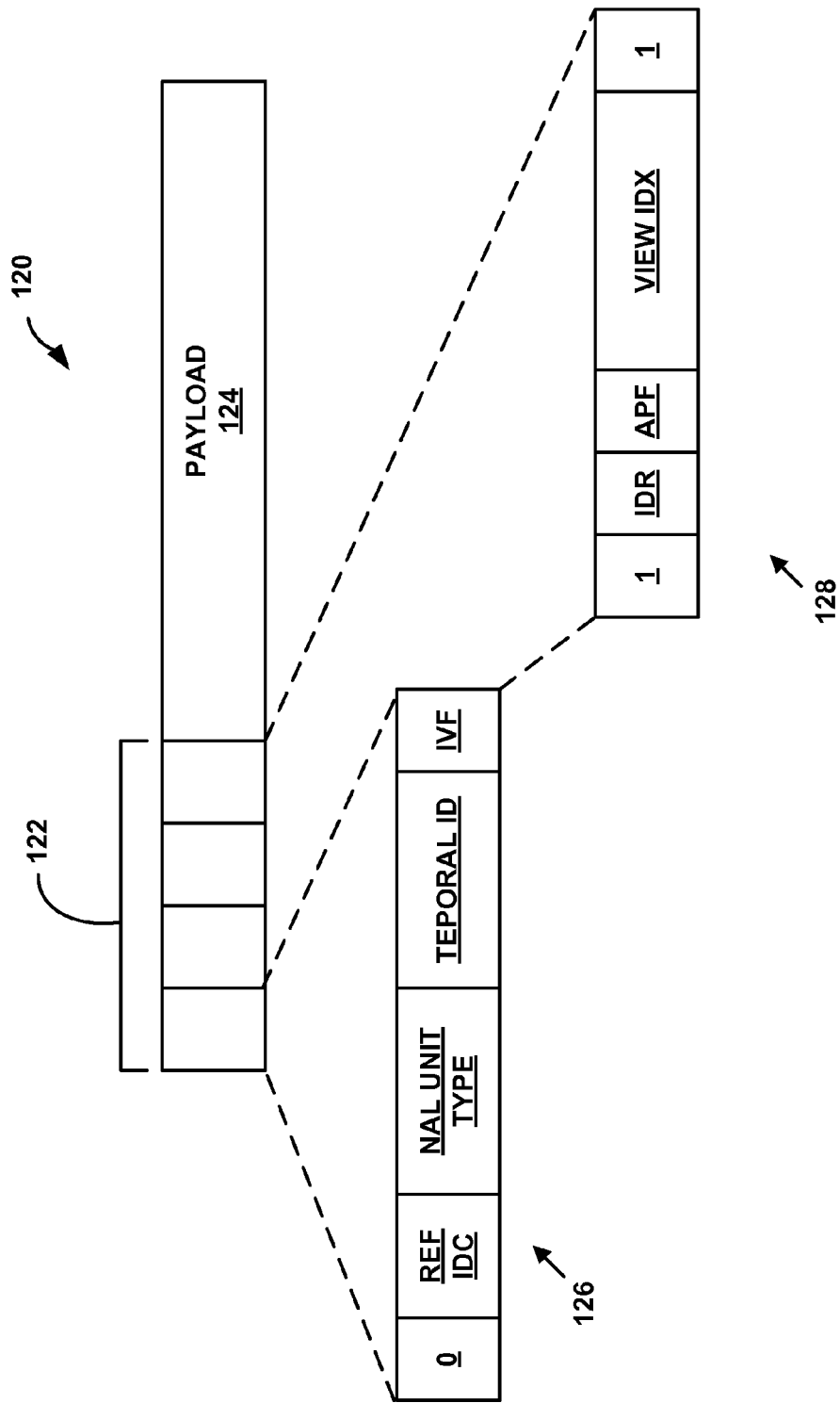
FIG. 5D is a conceptual diagram illustrating another example of a NAL unit that may be included in the bitstream structure of FIG. 5A.

FIG. 5D is a conceptual diagram illustrating an example NAL unit 120, which may be similar in structure to NAL units 106 shown in FIG. 5B. The example shown in FIG. 5D illustrates an example NAL unit according to aspects of this disclosure. For example, NAL unit 120 includes a NAL unit header 122 and payload 124. In addition, NAL unit header includes a first portion 126 and a NAL unit header extension 128.

As with the example shown in FIG. 5C, first portion 126 includes a ref_idc element and a NAL unit type element. The ref_idc element may indicate whether the NAL unit is used as a reference for other NAL units. The NAL unit type element may indicate the type of packets of NAL unit 120.

As shown in the example of FIG. 5D, however, rather than including a view_id in NAL unit header extension 128, a view order index is signaled as part of NAL unit header 122. That is, according to aspects of this disclosure, view order index of NAL unit header 122 may replace the view_id that is signaled in NAL unit header 110 (FIG. 5C). As noted above, view order generally describes the ordering of the views in an access unit, such as one of access units 102 (FIG. 5A). The view order index may indicate a particular view, such as one of views 104, in view order of the access unit. That is, the view order index may describe the decoding order of a corresponding view component of an access unit.

An example NAL unit header syntax table for extension 128 is provided in Table 12 below:

TABLE 12

NAL UNIT HEADER MVC EXTENSION

| nal_unit_header_mvc_extension( ) { | C | Descriptor |
|---|---|---|
| non_idr_flag | All | u(1) |
| anchor_pic_flag | All | u(1) |
| view_idx | All | u(5) |
| reserved_one_bit | All | u(1) |
| } | | |

In the example shown in FIG. 13, a non_idr_flag that is equal to 0 may indicate that the current access unit is an IDR access unit. The value of the non_idr_flag may be the same for all VCL NAL units of an access unit. In some instances, the non_idr_flag may be inferred to be 0 for a base view NAL unit that has nal_unit_type equal to 5. In addition, the non_idr_flag may be inferred to be 1 for a base view NAL unit that has nal_unit_type equal to 1. For NAL units in which non_idr_flag is present, a variable IdrPicFlag may be modified by setting the flag equal to 1 when non_idr_flag is equal to 0, and setting the equal to 0 when non_idr_flag is equal to 1.

In addition, an anchor_pic_flag that is equal to 1 may specify that the current access unit is an anchor access unit. In some instances, the anchor_pic_flag may be inferred to be equal to 0 for a base view NAL unit that has nal_unit_type equal to 1, and may be inferred to be 1 for a base view NAL unit that has nal_unit_type equal to 4 (Clean Decoding Refresh).

The view_idx may specify a view order index for the NAL unit. In general, NAL units with the same value of view_idx belong to the same view. NAL unit type equal to 20 can be used to indicate a NAL unit type for the view components not in the base view.

As shown in the example of Table 12, in contrast to the example shown in FIG. 5C, the priority_id, temporal_id, and inter_view_flag have been removed, and view_id has been replaced by view_idx. In some examples, the inter_view_flag may be moved out of the extension 128, as shown in the example NAL unit header of Table 13 below:

TABLE 13

NAL UNIT HEADER FOR BASE VIEW

| nal_unit( NumBytesInNALunit ) { | Descriptor |
|---|---|
|   forbidden_zero_bit | f(1) |
|   nal_ref_idc | u(2) |
|   nal_unit_type | u(5) |
|   NumBytesInRBSP = 0 | |
|   nalUnitHeaderBytes = 1 | |
|   if( nal_unit_type == 1 \|\| nal_unit_type == 5 ) { | |
|     temporal_id | u(3) |
|     output_flag | u(1) |
|     *reserved_zero_3bits* | u(3) |
|     *inter_view_flag* | u(1) |
|     nalUnitHeaderBytes += 1 | |
|   } | |
|   for( i = nalUnitHeaderBytes; i < NumBytesInNALunit; i++ ) { | |
|     if( i + 2 < NumBytesInNALunit && next_bits( 24 ) == 0x000003 ) { | |
|       rbsp_byte[ NumBytesInRBSP++ ] | b(8) |
|       rbsp_byte[ NumBytesInRBSP++ ] | b(8) |
|       i += 2 | |
|       emulation_prevention_three_byte /* equal to 0x03 */ | f(8) |
|     } else | |
|       rbsp_byte[ NumBytesInRBSP++ ] | b(8) |
|   } | |
| } | |

In the example shown in Table 13, an inter_view_flag element that is equal to 0 may indicate that the current view component is not used for inter-view prediction by any other view component in the current access unit. An inter_view_flag that is equal to 1 may indicate that the current view component may be used for inter-view prediction by other view components in the current access unit. The value of inter_view_flag may be the same for all VCL NAL units of a view component.

In addition, in the example shown in Table 13, when nal_unit_type is equal to 1 or 5, a view order index may be inferred to 0, and view_id of this view component is view_id[0]. In such an example a NAL unit header extension may not be needed. That is, in an MVC stream that includes only two views (that is, for stereo video), a view order index may not be needed, as a decoder (such as video decoder 30) may always decode a first view (e.g., view 0) prior to decoding a second view (e.g., view 1).

In some examples, a prefix NAL unit, which may be may no longer be required for a base view (e.g., view 0). For example, a prefix NAL unit for a base view may no longer be needed, because a view order index is always zero for the base view, and a temporal position of the base view can be determined using the temporal_id. Accordingly, the temporal_id in a NAL unit header provides all of the information needed to associate a particular view component with a particular view and with an appropriate temporal location.

Table 14 includes another NAL unit header, which refers to a NAL unit header extension:

TABLE 14

NAL UNIT HEADER

| nal_unit( NumBytesInNALunit ) { | Descriptor |
|---|---|
|   forbidden_zero_bit | f(1) |
|   nal_ref_idc | u(2) |
|   nal_unit_type | u(5) |
|   NumBytesInRBSP = 0 | |
|   nalUnitHeaderBytes = 1 | |
|   if( nal_unit_type = = 1 \|\| nal_unit_type = = 5 | |
|   \|\| nal_unit_type = = 4 \|\| nal_unit_type = = 20) { | |
|     temporal_id | u(3) |
|     output_flag | u(1) |
|     reserved_zero_3bits | u(3) |
|     inter_view_flag | u(1) |
|     nalUnitHeaderBytes += 1 | |
|   } | |
|   if( nal_unit_type = = 20 ) { | |
|     nal_unit_header_mvc_extension( ) | |
|     nalUnitHeaderBytes +=1 | |
|   } | |
|   for( i = nalUnitHeaderBytes; i < NumBytesInNALunit; i++ ) { | |
|     if( i + 2 < NumBytesInNALunit && next_bits( 24 ) = = 0x000003 ) { | |
|       rbsp_byte[ NumBytesInRBSP++ ] | b(8) |
|       rbsp_byte[ NumBytesInRBSP++ ] | b(8) |
|       i += 2 | |
|       emulation_prevention_three_byte /* equal to 0x03 */ | f(8) |
|     } else | |
|       rbsp_byte[ NumBytesInRBSP++ ] | b(8) |
|   } | |
| } | |

In the example shown in Table 14, an inter_view_flag that is equal to 0 may indicate that the current view component is not used for inter-view prediction by any other view component in the current access unit. An inter_view_flag that is equal to 1 may indicate that the current view component may be used for inter-view prediction by other view components in the current access unit. The value of inter_view_flag may be the same for all VCL NAL units of a view component. In addition, nal_unit_header_mvc_extension refers to an extension, such as that shown in Table 12 above.

According to other aspects of this disclosure, a NAL unit header for an MVC bitstream may be designed according to Table 15 below:

TABLE 15

NAL UNIT HEADER

| nal_unit( NumBytesInNALunit ) { | Descriptor |
|---|---|
|   forbidden_zero_bit | f(1) |
|   nal_ref_idc | u(2) |
|   nal_unit_type | u(5) |
|   NumBytesInRBSP = 0 | |
|   nalUnitHeaderBytes = 1 | |
|   if( nal_unit_type = = 1 \|\| nal_unit_type = = 5 \|\| nal_unit_type = = 4 | |
|   \|\| nal_unit_type = = 20) { | |
|     temporal_id | u(3) |
|     output_flag | u(1) |
|     inter_view_flag | u(1) |
|     if(nal_unit_type = = 20) { | |
|       non_idr_flag | u(1) |
|       anchor_pic_flag | u(1) |
|       view_idx | u(5) |
|       reserved_zero_4bits | u(4) |
|       nalUnitHeaderBytes += 2 | |
|     } | |
|     else { | |
|       reserved_zero_3bits | u(3) |
|       nalUnitHeaderBytes += 1 | |
|     } | |
|   } | |
|   for( i = nalUnitHeaderBytes; i < NumBytesInNALunit; i++ ) { | |
|     if( i + 2 < NumBytesInNALunit && next_bits( 24 ) = = 0x000003 ) { | |
|       rbsp_byte[ NumBytesInRBSP++ ] | b(8) |
|       rbsp_byte[ NumBytesInRBSP++ ] | b(8) |
|       i += 2 | |
|       emulation_prevention_three_byte /* equal to 0x03 */ | f(8) |
|     } else | |
|       rbsp_byte[ NumBytesInRBSP++ ] | b(8) |
|   } | |
| } | |

In the example shown in Table 15, formation of the NAL unit header may depend, for example, on the nal_unit_type. That is, for example, when nal_unit_type is equal to 20, and MVC NAL unit, the NAL unit may include the non_idr_flag, the anchor_pic_flag, and the view_idx described above. Accordingly, for a stereo profile, a NAL unit header may be designed according to Table 16 below:

TABLE 16

NAL UNIT HEADER

| nal_unit( NumBytesInNALunit ) { | Descriptor |
|---|---|
|   forbidden_zero_bit | f(1) |
|   nal_ref_idc | u(2) |
|   nal_unit_type | u(5) |
|   NumBytesInRBSP = 0 | |
|   nalUnitHeaderBytes = 1 | |
|   if( nal_unit_type = = 1 \|\| nal_unit_type = = 5 \|\| nal_unit_type = = 4 | |
|   \|\| nal_unit_type = = 20) { | |
|     temporal_id | u(3) |
|     output_flag | u(1) |
|     inter_view_flag | u(1) |
|     if(nal_unit_type = = 20) { | |
|       non_idr_flag | u(1) |

TABLE 16-continued

NAL UNIT HEADER

| nal_unit( NumBytesInNALunit ) { | Descriptor |
|---|---|
|     anchor_pic_flag | u(1) |
|     reserved_zero_1bits | u(1) |
|   } | |
|   else { | |
|     reserved_zero_3bits | u(3) |
|   } | |
|   nalUnitHeaderBytes += 1 | |
| } | |
| for( i = nalUnitHeaderBytes; i < NumBytesInNALunit; i++ ) { | |
|   if( i + 2 < NumBytesInNALunit && next_bits( 24 ) = = 0x000003 ) { | |
|     rbsp_byte[ NumBytesInRBSP++ ] | b(8) |
|     rbsp_byte[ NumBytesInRBSP++ ] | b(8) |
|     i += 2 | |
|     emulation_prevention_three_byte /* equal to 0x03 */ | f(8) |
|   } else | |
|     rbsp_byte[ NumBytesInRBSP++ ] | b(8) |
| } | |

In still another example, according to other aspects of this disclosure, a NAL unit header for an MVC bitstream may be designed according to Table 17 below:

TABLE 17

NAL UNIT HEADER

| nal_unit( NumBytesInNALunit ) { | Descriptor |
|---|---|
| forbidden_zero_bit | f(1) |
| nal_ref_idc | u(2) |
| nal_unit_type | u(5) |
| NumBytesInRBSP = 0 | |
| nalUnitHeaderBytes = 1 | |
| if( nal_unit_type = = 1 \|\| nal_unit_type = = 5 \|\| nal_unit_type = =4 | |
|   \|\| *nal_unit_type = = 20)* { | |
|   temporal_id | u(3) |
|   output_flag | u(1) |
|   *inter_view_flag* | u(1) |
|   *non_idr_flag* | u(1) |
|   *anchor_pic_flag* | u(1) |
|   *reserved_zero_1bits* | u(1) |
|   nalUnitHeaderBytes += 1 | |
| } | |
| for( i = nalUnitHeaderBytes; i < NumBytesInNALunit; i++ ) { | |
|   if( i + 2 < NumBytesInNALunit && next_bits( 24 ) = = 0x000003 ) { | |
|     rbsp_byte[ NumBytesInRBSP++ ] | b(8) |
|     rbsp_byte[ NumBytesInRBSP++ ] | b(8) |
|     i += 2 | |
|     emulation_prevention_three_byte /* equal to 0x03 */ | f(8) |
|   } else | |
|     rbsp_byte[ NumBytesInRBSP++ ] | b(8) |
| } | |
| } | |

Regardless of the particular configuration of the NAL unit header, as described above with respect to FIG. 4, a sequence parameter set (SPS) may provide a relationship between view_ids for the views and view order indexes for the views. Accordingly, using the view order index and the data in the SPS, the 10 bit view_id of MVC/AVC may be replaced in the NAL unit header by the view order index, which may lead to a bit savings over the MVC/AVC scheme. The view order index can be used with a POC value or frame value (frame number) to identify a view component of a bitstream. For example, relating the grid of view components shown in FIG. 4 to a Cartesian grid, the view order index may provide the y-coordinate (e.g., S0, S1, S2 . . . ) of a particular view component, while the POC value or frame value may provide the x-coordinate (e.g., T0, T1, T2 . . . ) of the particular view component. Identifying view components in this way may be implemented, for example, in a reference picture list.

According to other aspects of this disclosure, view dependency for each view of an MVC bitstream may be signaled commonly for all view components, regardless of whether the view components are for anchor pictures and non-anchor pictures. In some examples, an SPS may include view dependencies for the view components, rather than relying on information in a NAL unit header. In this manner, the anchor_pic_flag used in NAL unit header extension 128 may be removed.

In this example, a view component of a signaled dependent view can be used as a reference picture in both List 0 and List 1, as described above with respect to FIG. 4. In addition, reference picture list construction and reference picture list reordering for List 0 and List 1 may also be based on common signaling for anchor pictures and non-anchor pictures. In some examples, a sequence level, supplemental enhancement information (SEI) message maybe used to indicate when a non-anchor picture has a different view dependency than an anchor picture.

According to other aspects of this disclosure, rather than signaling the priority_id in the NAL unit header, video encoder 20 may provide priority_id values in an SPS. As discussed above, in some examples, router 36 may use the SPS priority_id values to filter certain views. That is, router 36 may receive the full bitstream, but extract a sub-bitstream including NAL units having priority_id values at and below a priority value specified by destination device 14, and forward the sub-bitstream to destination device.

In addition, according to aspects of this disclosure, a priority adaptation message may be used to perform adaptation. For example, Table 18 below shows an example priority adaptation SEI message:

TABLE 18

PRIORITY ADAPTATION SEI MESSAGE

| priority_adaptation_SEI( payloadSize ) { | C | Descriptor |
|---|---|---|
|   num_temproal_id_minus1 | 5 | u(3) |
|   for( i = 0; i <= num_temproal_id_minus1; i++ ) | | |
|     for (j = 0; j <= num_views_minus1; j++ ) { | | |
|       same_priority_id_flag[ i ][ j ] | 5 | u(1) |
|       if (!same_priority_id_flag[ i ][ j ]) | | |
|         priority_id[ i ][ j ] | 5 | u(6) |
|     } | | |
| } | | |

In the example shown in Table 18, the num_temporal_id_minus1 plus 1 may indicates the highest temporal_id of the NAL units of the MVC bitstream. The same_priority_id_flag[i][j] equal to 1 element may indicate that the priority_id of the NAL units with a temporal_id i and a view order index j is equal to the previously signaled priority_id, which may be priority_id[i][j−1], when j>0, or priority_id [i−1][j] when j=0 and i>0. The priority_id[i][j] element may specify a priority identifier for NAL units with temporal_id equal to i and view order index equal to j. A lower value of priority_id may indicate a higher priority.

Adaptation may be based on the NAL unit header and an SEI message, such as that shown in Table 18. For example, an adaptation process may assume that the temporal_id and view_idx of the NAL unit is TID and VIDX, and the target priority_id is PID. In this example, if priority_id[TID][VIDX] is not larger than PID, the NAL unit is kept, otherwise, the NAL unit is filtered out.

While the example describes the priority information in an SEI message, in other examples, the information described as being signalled in the SEI message may be signalled as an optional part of a parameter set, such as an MVC SPS.

Figure 6:
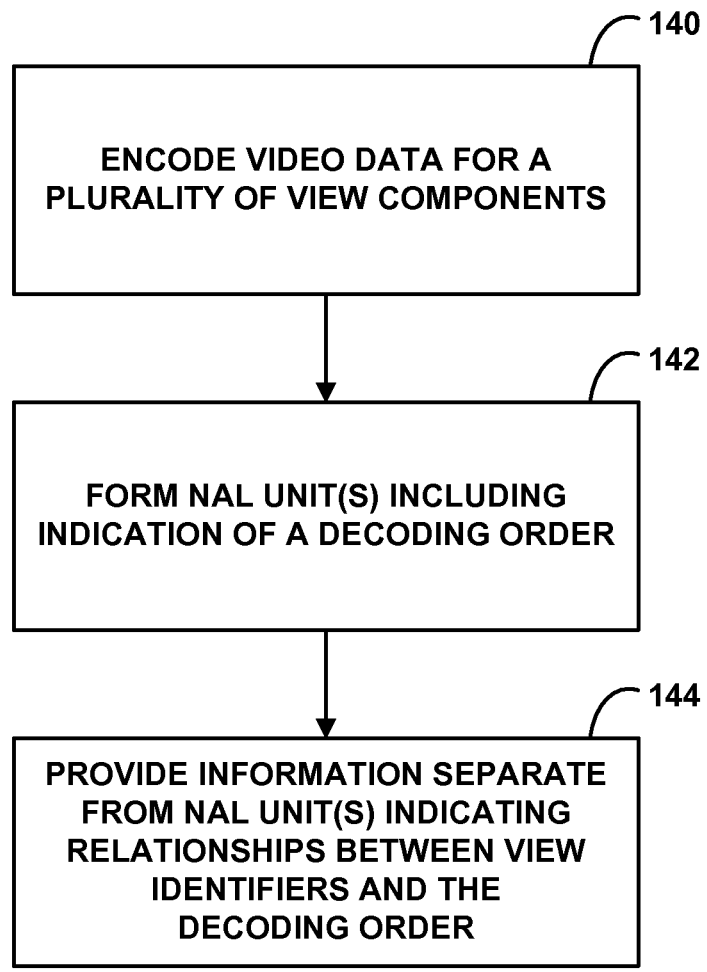
FIG. 6 is a flow diagram illustrating an example method of encoding a multiview bitstream.

FIG. 6 is a flow diagram illustrating an example method of encoding a multiview bitstream. The example shown in FIG. 6 is generally described as being performed by video encoder 20 (FIGS. 1 and 2). However, it should be understood that the process described with respect to FIG. 6 may be carried out by a variety of other processors, processing units, hardware-based coding units such as encoder/decoders (CODECs), and the like.

In the example of FIG. 6, video encoder 20 may encode video data for a plurality of view components (140). For example, video encoder 20 may encode a plurality of a plurality of different views, with each view corresponding to a different perspective, or angle, at which corresponding video data of a common scene was captured. As noted above, a particular picture of a particular view is referred to as a view component. That is, a view component of a view corresponds to particular temporal instance of the view.

Video encoder 20 may also form NAL units that include an indication of a decoding order of the view components (142). For example, as described with respect to FIGS. 5A-5D, according to aspects of this disclosure, video encoder 20 may provide an indication of a view order index (view_idx) in NAL unit headers that provides an indication of the decoding order of the view components. In general, NAL units with the same value of view_idx belong to the same view.

Video encoder 20 may also provide information, separately from the NAL units, which provides an indication of the relationships between view identifiers and the decoding order (144). In some examples, video encoder 20 may generate a parameter set, such as an SPS, which indicates a relationship between view identifiers for the views and view order indexes for the views. In other examples, video encoder 20 may indicate the relationship between view order indexes and view identifiers in a different manner.

Using the view order index and the separate information, video encoder 20 may replace the 10 bit view identifier typically included in a NAL unit header by the view order index, which may provide a bit savings. For example, a view order index may include substantially fewer bits than a view identifier. While video encoder 20 must signal the relationship between the view order index and the view identifiers, e.g., in an SPS, NAL unit headers typically consume many more bits than such signaling. Replacing a view identifier in a NAL unit header with a view order index may reduce the size of the NAL unit headers, thereby achieving a bit savings over coding a view identifier in a NAL unit header.

It should also be understood that the steps shown and described with respect to FIG. 6 are provided as merely one example. That is, the steps of the method of FIG. 6 need not necessarily be performed in the order shown in FIG. 6, and fewer, additional, or alternative steps may be performed.

Figure 7:
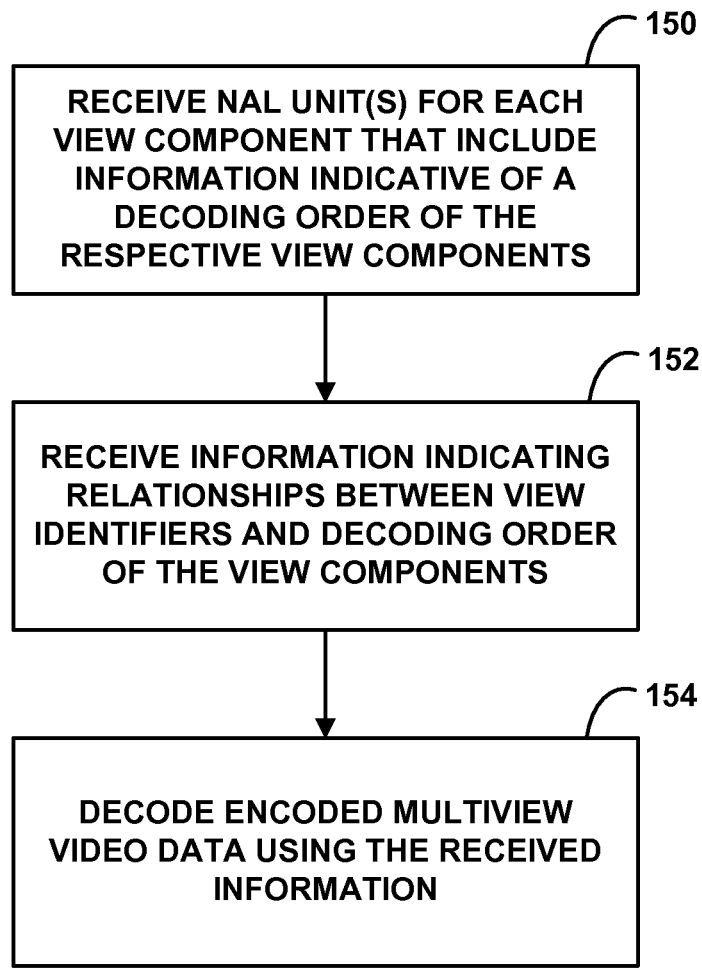
FIG. 7 is a flow diagram illustrating an example method of decoding a multiview bitstream.

FIG. 7 is a flow diagram illustrating an example method of decoding a multiview bitstream. The example shown in FIG. 7 is generally described as being performed by video decoder 30 (FIGS. 1 and 3). However, it should be understood that the process described with respect to FIG. 7 may be carried out by a variety of other processors, processing units, hardware-based coding units such as encoder/decoders (CODECs), and the like.

In the example of FIG. 7, video decoder 30 may receive one or more NAL units for each view component that include information indicative of a decoding order of the respective view components (150). According to aspects of this disclosure, as described with respect to FIG. 6, the decoding order of the respective view components may be indicated using a view order index. Accordingly, video decoder 30 may receive an indication of a view order index (view_idx) in NAL unit headers that provides an indication of the decoding order of the view components. In general, NAL units with the same value of view_idx belong to the same view.

Video decoder 30 may also receive information indicating relationships between view identifiers and the decoding order of the view components (152). In some examples, video decoder 30 may receive a parameter set, such as an SPS, which indicates a relationship between view identifiers for the views and view order indexes for the views. In other examples, video decoder 30 may receive a different indication of the relationship between view order indexes and view identifiers.

Video decoder 30 may also decode the multiview video data using the received information. That is, for example, video decoder may decode each of the views, and determine the appropriate view identifier using the received separate information. Video decoder 30 may then present a 3D representation using the views, e.g., on display device 32.

It should also be understood that the steps shown and described with respect to FIG. 7 are provided as merely one example. That is, the steps of the method of FIG. 7 need not necessarily be performed in the order shown in FIG. 7, and fewer, additional, or alternative steps may be performed.

Figure 8:
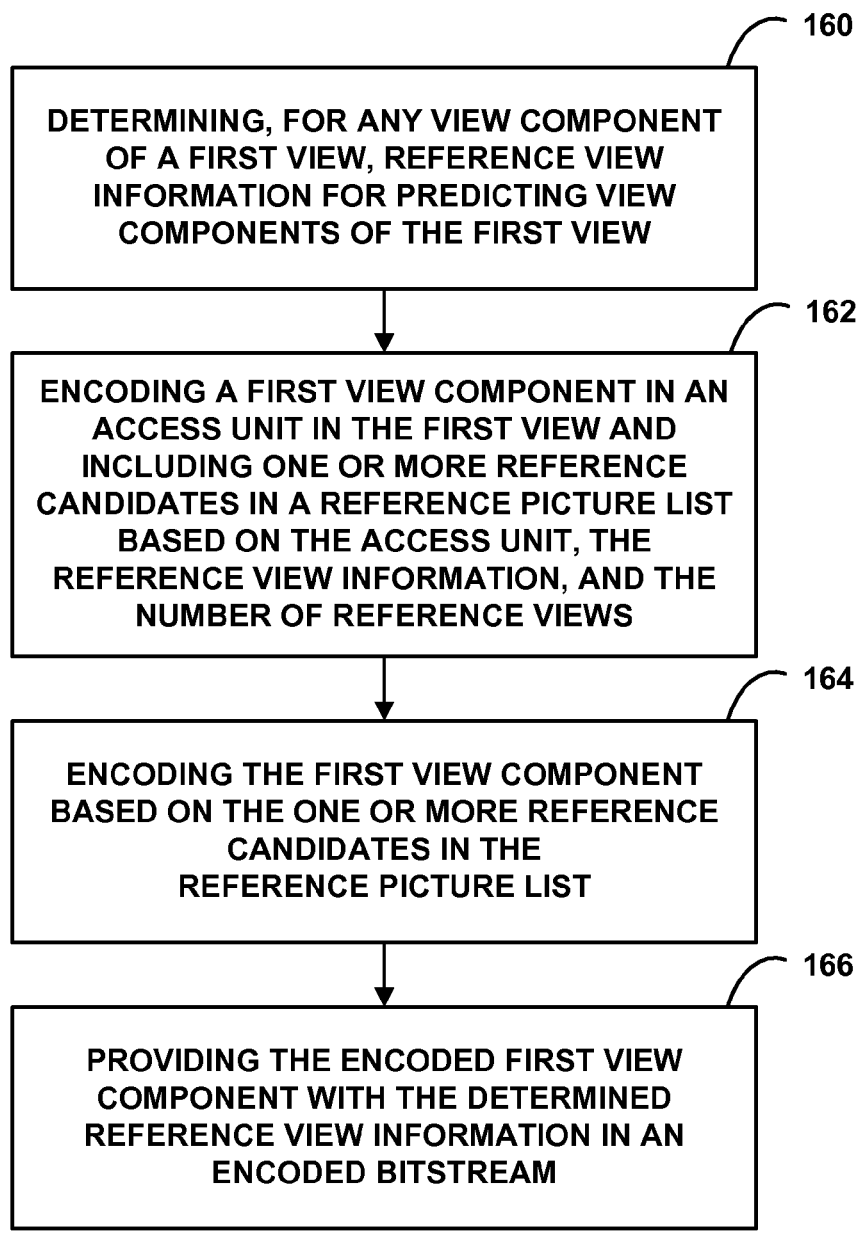
FIG. 8 is a flow diagram illustrating an example method of encoding a multiview bitstream.

FIG. 8 is a flow diagram illustrating an example method of encoding a multiview bitstream. The example shown in FIG. 8 is generally described as being performed by video encoder 20 (FIGS. 1 and 2). In other examples, the process described with respect to FIG. 8 may be carried out by a variety of other processors, processing units, hardware-based coding units such as encoder/decoders (CODECs), and the like. In the example of FIG. 8, video encoder 20 may determine, for any view component of a first view, reference view information indicating one or more reference views for predicting view components of the first view (160). For example, as noted above, view dependencies may be signaled in the same manner for all view components of a view, regardless of whether a particular view component of a particular access unit is an anchor picture (random access point), or whether the particular view component of the particular access unit is a non-anchor picture. In some instances, the reference view information may indicate view dependencies using reference view index values (view order index values for the reference views). That is, the reference view information may contain reference view index values for each reference view, which may indicate the decoding order of the reference view in an access unit. In other examples, the reference view information may contain reference view index difference values, which may indicate a difference between a view order index of a particular reference view and a view order index of the view component currently being encoded. In examples in which view order index values are used, as described above, video encoder 20 may also provide additional information that indicates the relationships between the view order index values and view identifiers of the views.

Video encoder 20 may also, when encoding a first view component in an access unit in the first view, include one or more reference candidates in a reference picture list based on the access unit from which the first view component belongs, the reference view information, and the number of reference views indicated by the reference view information (162). For example, as described above, video encoder 20 may construct a reference picture list that includes candidate reference pictures for predicting the first view component ("candidate" reference pictures, because the reference pictures may be removed from a final reference picture list). Video encoder 20 may identify inter-view candidate reference pictures in each of the reference views indicated by the reference view information that belong to the same access unit (e.g., have the same temporal instance) as the first view component. Video encoder 20 may add all of the identified view components to the reference picture list.

Accordingly, in the example shown in FIG. 8, video encoder 20 may construct the reference picture list without regard to whether a view component currently being encoded is an anchor picture or non-anchor picture. Moreover, video encoder 20 may construct the reference picture list without regard for whether candidate reference pictures are included in List 0 or List 1. That is, video encoder 20 may construct a reference picture List 0 or a reference picture List 1 using the same reference view information. In addition, video encoder 20 may add the identified reference candidates to both List 0 or List 1 alike.

Video encoder 20 may also encode the first view component based on the one or more reference candidates in the reference picture list (164). For example, video encoder 20 may identify a view component in the reference picture list, generate residual data using the identified view component, and encode the residual data as described with respect to FIG. 2. Video encoder 20 may also provide the encoded first view component with the determined reference view information in an encoded bitstream (166).

It should be understood that the steps shown and described with respect to FIG. 8 are provided as merely one example. That is, the steps of the method of FIG. 8 need not necessarily be performed in the order shown in FIG. 8, and fewer, additional, or alternative steps may be performed.

Figure 9:
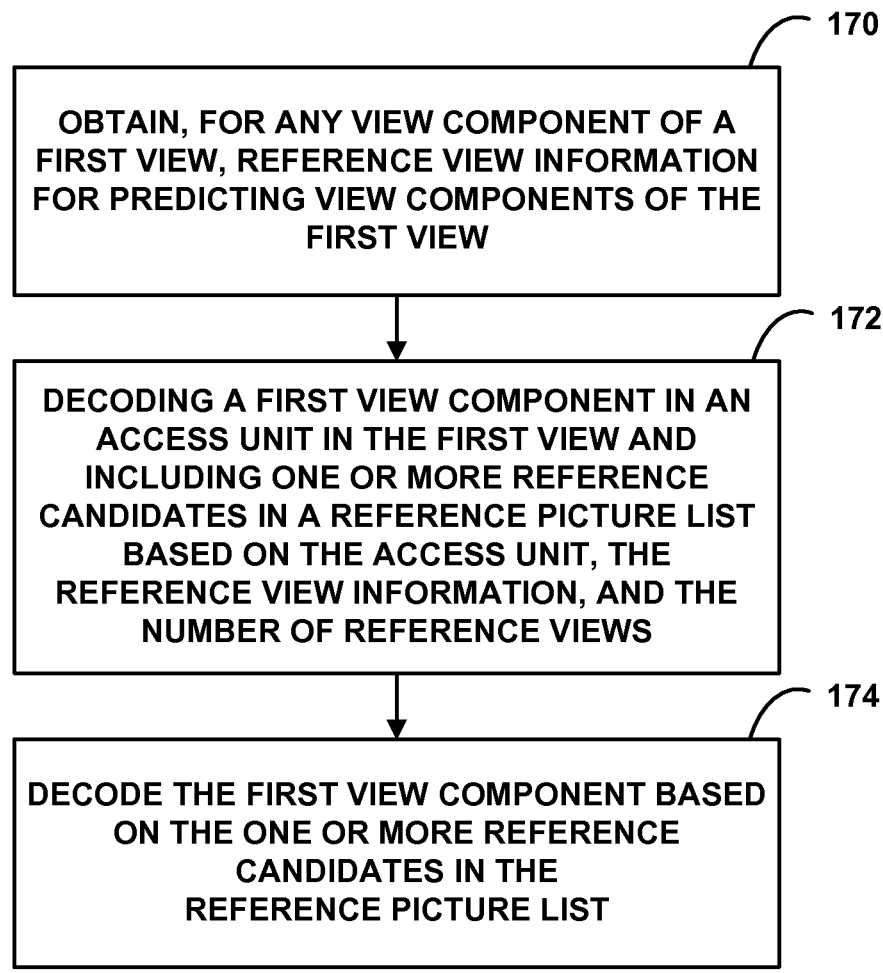
FIG. 9 is a flow diagram illustrating an example method of decoding a multiview bitstream.

FIG. 9 is a flow diagram illustrating an example method of decoding a multiview bitstream. The example shown in FIG. 9 is generally described as being performed by video decoder 30 (FIGS. 1 and 3). In other examples, the process described with respect to FIG. 9 may be carried out by a variety of other processors, processing units, hardware-based coding units such as encoder/decoders (CODECs), and the like.

In the example shown in FIG. 9, video decoder 30 may obtain, from an encoded bitstream and for any view component of a first view, reference view information indicating one or more reference views for predicting view components of the first view (170). For example, as noted above with respect to FIG. 8, view dependencies may be signaled in the same manner for all view components of a view, regardless of whether a particular view component of a particular access unit is an anchor picture (random access point), or whether the particular view component of the particular access unit is a non-anchor picture. In some instances, the reference view information may indicate view dependencies using reference view index values (view order index values for the reference views). That is, the reference view information may contain reference view index values for each reference view, which may indicate the decoding order of the reference view in an access unit. In other examples, the reference view information may contain reference view index difference values, which may indicate a difference between a view order index of a particular reference view and a view order index of the view component currently being encoded. In examples in which view order index values are used, as described above, video decoder 30 may also obtain additional information from the encoded bitstream that indicates the relationships between the view order index values and view identifiers of the views. Such information may be obtained from the sequence level.

Video decoder 30 may also, when decoding a first view component in an access unit in the first view, include one or more reference candidates in a reference picture list based on the access unit from which the first view component belongs, the reference view information, and the number of reference views indicated by the reference view information (172). For example, as described above, video decoder 30 may construct a reference picture list that includes candidate reference pictures for predicting the first view component. Video decoder 30 may identify inter-view candidate reference pictures in each of the reference views indicated by the reference view information that belong to the same access unit (e.g., have the same temporal instance) as the first view component. Video decoder 30 may add all of the identified view components to the reference picture list.

Accordingly, in the example shown in FIG. 9, video decoder 30 may construct the reference picture list without regard to whether a view component currently being encoded is an anchor picture or non-anchor picture. Moreover, video decoder 30 may construct the reference picture list without regard for whether candidate reference pictures are included in List 0 or List 1. That is, video decoder 30 may construct a reference picture List 0 or a reference picture List 1 using the same reference view information, which may only be obtained from the encoded bitstream once. In addition, video decoder 30 may add the identified reference candidates to both List 0 or List 1 alike.

Video decoder 30 may also decode the first view component based on the one or more reference candidates in the reference picture list (174). For example, video decoder 20 may identify a view component in the reference picture list, combine the identified view component with decoded residual data (from the encoded bitstream) to generate the view component, as described with respect to FIG. 3 above.

It should be understood that the steps shown and described with respect to FIG. 9 are provided as merely one example. That is, the steps of the method of FIG. 9 need not necessarily be performed in the order shown in FIG. 9, and fewer, additional, or alternative steps may be performed.

While certain syntax elements described with respect to this disclosure have been provided example names for purposes of explanation, it should be understood that the concepts described in this disclosure are more generally applicable to any syntax elements, regardless of name. For example, while certain aspects refer to a "view order index," "view_order_index" or "view_idx," it should be understood that such a syntax element may be given an alternative name in a future coding standard.

While certain techniques of this disclosure are described with respect to the emerging HEVC standard, it should be understood that the techniques are not limited to any particular coding standard. That is, the techniques more generally relate to achieving coding efficiencies in multiview video coding, for example, through shorter and/or less complex NAL units and parameter sets, as described above.

It should be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method of decoding video data comprising:
obtaining only once for a plurality of view components of a first view, from an encoded bitstream, reference view information that is applicable to any view component of the first view including any view component that is used as a random access point and any view component that is not used as a random access point and that is the same for any view component of the first view including any view component that is used as a random access point and any view component that is not used as a random access point, wherein the reference view information indicates one or more reference views for predicting the plurality of view components of the first view, and wherein the plurality of view components of a first view comprise a sequence of view components of the first view that includes at least one view component that is used as a random access point and at least one view component that is not used as a random access point;
including, for decoding a first view component of the plurality of view components in an access unit and in the first view, one or more reference candidates in a reference picture list, wherein the one or more reference candidates comprise view components in the access unit and in the reference views indicated by the reference view information, wherein the number of reference candidates is equal to the number of reference views; and
decoding the first view component based on the one or more reference candidates in the reference picture list.

2. The method of claim 1, wherein the reference picture list comprises one of a first reference picture list and a second reference picture list, and wherein the reference view information is the same and only included once for the first reference picture list and the second reference picture list of any view component of the first view, and wherein including view components of the one or more reference views as reference candidates comprises adding the same view components to the first reference picture list and the second reference picture list.

3. The method of claim 1, wherein the reference view information comprises, for each reference view, an indication of a view order index indicating a decoding order of a view within an access unit.

4. The method of claim 3, wherein the indication of the view order index comprises a difference between the view order index of a reference view and the view order index of the first view.

5. The method of claim 1, wherein obtaining the reference view information comprises obtaining the reference view information at a sequence level.

6. The method of claim 5, wherein obtaining the reference view information comprises obtaining the reference view information for each view at a sequence level.

7. The method of claim 5, wherein obtaining the reference view information at the sequence level comprises obtaining a view order index of the one or more reference views in a sequence parameter set (SPS).

8. The method of claim 1, further comprising adding view components of the same access unit into one of a first initial list of a first reference picture list, and a second initial list of a second reference picture list based on the order in which the one or more reference views are included in the reference view information.

9. The method of claim 1, further comprising reordering the one or more reference candidates to any position of a final reference picture list.

10. The method of claim 1, wherein reordering the one or more reference candidates is based on the reference view information.

11. The method of claim 1, further comprising excluding the one or more reference candidates from a final reference picture list.

12. An apparatus for decoding video data, the apparatus comprising one or more processors configured to:
obtain only once for a plurality of view components of a first view, from an encoded bitstream, reference view information that is applicable to any view component of the first view including any view component that is used as a random access point and any view component that is not used as a random access point and that is the same for any view component of the first view including any view component that is used as a random access point and any view component that is not used as a random access point, wherein the reference view information indicates one or more reference views for predicting the plurality of view components of the first view, and wherein the plurality of view components of a first view comprise a sequence of view components of the first view that includes at least one view component that is used as a random access point and at least one view component that is not used as a random access point;
include, for decoding a first view component of the plurality of view components in an access unit and in the first view, one or more reference candidates in a reference picture list, wherein the one or more reference candidates comprise view components in the access unit and in the reference views indicated by the reference view information, wherein the number of reference candidates is equal to the number of reference views; and
decode the first view component based on the one or more reference candidates in the reference picture list.

13. The apparatus of claim 12, wherein the reference picture list comprises one of a first reference picture list and a second reference picture list, and wherein the reference view information is the same and only included once for the first reference picture list and the second reference picture list of any view component of the first view, and wherein to include view components of the one or more reference views as reference candidates the one or more processors are configured to add the same view components to the first reference picture list and the second reference picture list.

14. The apparatus of claim 12, wherein the reference view information comprises, for each reference view, an indication of a view order index indicating a decoding order of a view within an access unit.

15. The apparatus of claim 14, wherein the indication of the view order index comprises a difference between the view order index of a reference view and the view order index of the first view.

16. The apparatus of claim 12, wherein to obtain the reference view information the one or more processors are configured to obtain the reference view information at a sequence level.

17. The apparatus of claim 16, wherein to obtain the reference view information the one or more processors are configured to obtain the reference view information for each view at a sequence level.

18. The apparatus of claim 16, wherein to obtain the reference view information at the sequence level comprises the one or more processors are configured to obtain a view order index of the one or more reference views in a sequence parameter set (SPS).

19. The apparatus of claim 12, the one or more processors are further configured to add view components of the same access unit into one of a first initial list of a first reference picture list, and a second initial list of a second reference picture list based on the order in which the one or more reference views are included in the reference view information.

20. The apparatus of claim 12, the one or more processors are further configured to reorder the one or more reference candidates to any position of a final reference picture list.

21. The apparatus of claim 12, wherein the one or more processors are configured to reorder the one or more reference candidates based on the reference view information.

22. The apparatus of claim 12, the one or more processors are configured to exclude the one or more reference candidates from a final reference picture list.

23. An apparatus for decoding video data, the apparatus comprising:
means for obtaining only once for a plurality of view components of a first view, from an encoded bitstream, reference view information that is applicable to any view component of the first view including any view component that is used as a random access point and any view component that is not used as a random access point and that is the same for any view component of the first view including any view component that is used as a random access point and any view component that is not used as a random access point, wherein the reference view information indicates one or more reference views for predicting the plurality of view components of the first view, and wherein the plurality of view components of a first view comprise a sequence of view components of the first view that includes at least one view component that is used as a random access point and at least one view component that is not used as a random access point;
means for including, for decoding a first view component of the plurality of view components in an access unit and in the first view, one or more reference candidates in a reference picture list, wherein the one or more reference candidates comprise view components in the access unit and in the reference views indicated by the reference view information, wherein the number of reference candidates is equal to the number of reference views; and means for decoding the first view component based on the one or more reference candidates in the reference picture list.

24. The apparatus of claim 23, wherein the reference picture list comprises one of a first reference picture list and a second reference picture list, and wherein the reference view information is the same and only included once for the first reference picture list and the second reference picture list of any view component of the first view, and wherein means for including view components of the one or more reference views as reference candidates comprises means for adding the same view components to the first reference picture list and the second reference picture list.

25. The apparatus of claim 23, wherein the reference view information comprises, for each reference view, an indication of a view order index indicating a decoding order of a view within an access unit.

26. The apparatus of claim 25, wherein the indication of the view order index comprises a difference between the view order index of a reference view and the view order index of the first view.

27. A non-transitory computer-readable storage medium having instructions stored thereon that, when executed, cause one or more processors to:
obtain only once for a plurality of view components of a first view, from an encoded bitstream, reference view information that is applicable to any view component of the first view including any view component that is used as a random access point and any view component that is not used as a random access point and that is the same for any view component of the first view including any view component that is used as a random access point and any view component that is not used as a random access point, wherein the reference view information indicates one or more reference views for predicting the plurality of view components of the first view, and wherein the plurality of view components of a first view comprise a sequence of view components of the first view that includes at least one view component that is used as a random access point and at least one view component that is not used as a random access point;
include, for decoding a first view component of the plurality of view components in an access unit and in the first view, one or more reference candidates in a reference picture list, wherein the one or more reference candidates comprise view components in the access unit and in the reference views indicated by the reference view information, wherein the number of reference candidates is equal to the number of reference views; and
decode the first view component based on the one or more reference candidates in the reference picture list.

28. The non-transitory computer-readable storage medium of claim 27, wherein the reference picture list comprises one of a first reference picture list and a second reference picture list, and wherein the reference view information is the same and only included once for the first reference picture list and the second reference picture list of any view component of the first view, and wherein to include view components of the one or more reference views as reference candidates the instructions cause the one or more processors to add the same view components to the first reference picture list and the second reference picture list.

29. The non-transitory computer-readable storage medium of claim 27, wherein the reference view information comprises, for each reference view, an indication of a view order index indicating a decoding order of a view within an access unit.

30. The non-transitory computer-readable storage medium of claim 29, wherein the indication of the view order index comprises a difference between the view order index of a reference view and the view order index of the first view.

31. A method of encoding video data comprising:
determining, for any view component of a first view including any view component that is used as a random access point and any view component that is not used as a random access point, reference view information indicating one or more reference views for predicting a plurality of view components of the first view, wherein the plurality of view components of a first view comprise a sequence of view components of the first view that includes at least one view component that is used as a random access point and at least one view component that is not used as a random access point;
including, for encoding a first view component in an access unit and in the first view, one or more reference candidates in a reference picture list, wherein the one or more reference candidates comprise view components in the access unit and in the reference views indicated by the reference view information, wherein the number of reference candidates is equal to the number of reference views;
encoding the first view component based on the one or more reference candidates in the reference picture list; and
providing, only once for the plurality of view components of the first view, the determined reference view information that is applicable to any view component of the plurality of view components of the first view in an encoded bitstream and that is the same for any view component of the first view including any view component that is used as a random access point and any view component that is not used as a random access point.

32. The method of claim 31, wherein the reference picture list comprises one of a first reference picture list and a second reference picture list, and wherein the reference view information is the same and only provided once for the first reference picture list and the second reference picture list of any view component of the first view, and wherein including view components of the one or more reference views as reference candidates comprises adding the same view components to the first reference picture list and the second reference picture list.

33. The method of claim 31, wherein the reference view information comprises, for each reference view, an indication of a view order index indicating a decoding order of a view within an access unit.

34. The method of claim 33, wherein the indication of the view order index comprises a difference between the view order index of a reference view and the view order index of the first view.

35. The method of claim 31, wherein providing the reference view information comprises providing the reference view information at a sequence level.

36. The method of claim 35, wherein providing the reference view information comprises providing the reference view information for each view at a sequence level.

37. The method of claim 35, wherein providing the reference view information at the sequence level comprises providing a view order index of the one or more reference views in a sequence parameter set (SPS).

38. The method of claim 31, further comprising adding view components of the same access unit into one of a first initial list of a first reference picture list, and a second initial list of a second reference picture list based on the order in which the one or more reference views are included in the reference view information.

39. The method of claim 31, further comprising reordering the one or more reference candidates to any position of a final reference picture list.

40. The method of claim 31, wherein reordering the one or more reference candidates is based on the reference view information.

41. The method of claim 31, further comprising excluding the one or more reference candidates from a final reference picture list.

42. An apparatus for encoding video data comprising one or more processors configured to:
- determine, for any view component of a first view including any view component that is used as a random access point and any view component that is not used as a random access point, reference view information indicating one or more reference views for predicting a plurality of view components of the first view, wherein the plurality of view components of a first view comprise a sequence of view components of the first view that includes at least one view component that is used as a random access point and at least one view component that is not used as a random access point;
- include, for encoding a first view component in an access unit and in the first view, one or more reference candidates in a reference picture list, wherein the one or more reference candidates comprise view components in the access unit and in the reference views indicated by the reference view information, wherein the number of reference candidates is equal to the number of reference views;
- encode the first view component based on the one or more reference candidates in the reference picture list; and
- provide, only once for the plurality of view components of the first view, the determined reference view information that is applicable to any view component of the plurality of view components of the first view in an encoded bitstream and that is the same for any view component of the first view including any view component that is used as a random access point and any view component that is not used as a random access point.

43. The apparatus of claim 42, wherein the reference picture list comprises one of a first reference picture list and a second reference picture list, and wherein the reference view information is the same and only provided once for the first reference picture list and the second reference picture list of any view component of the first view, and wherein to include view components of the one or more reference views as reference candidates the one or more processors are configured to add the same view components to the first reference picture list and the second reference picture list.

44. The apparatus of claim 42, wherein the reference view information comprises, for each reference view, an indication of a view order index indicating a decoding order of a view within an access unit.

45. The apparatus of claim 44, wherein the indication of the view order index comprises a difference between the view order index of a reference view and the view order index of the first view.

46. The apparatus of claim 42, wherein to provide the reference view information the one or more processors are configured to provide the reference view information at a sequence level.

47. The apparatus of claim 46, wherein to provide the reference view information the one or more processors are configured to provide the reference view information for each view at a sequence level.

48. The apparatus of claim 46, wherein to provide the reference view information at the sequence level the one or more processors are configured to provide a view order index of the one or more reference views in a sequence parameter set (SPS).

49. The apparatus of claim 42, the one or more processors are further configured to add view components of the same access unit into one of a first initial list of a first reference picture list, and a second initial list of a second reference picture list based on the order in which the one or more reference views are included in the reference view information.

50. The apparatus of claim 42, the one or more processors are further configured to reorder the one or more reference candidates to any position of a final reference picture list.

51. The apparatus of claim 42, wherein the reordering of the one or more reference candidates is based on the reference view information.

52. The apparatus of claim 42, wherein the one or more processors are further configured to exclude the one or more reference candidates from a final reference picture list.

53. An apparatus for encoding video data, the apparatus comprising:
- means for determining, for any view component of a first view including any view component that is used as a random access point and any view component that is not used as a random access point, reference view information indicating one or more reference views for predicting a plurality of view components of the first view, wherein the plurality of view components of a first view comprise a sequence of view components of the first view that includes at least one view component that is used as a random access point and at least one view component that is not used as a random access point;
- means for including, for encoding a first view component in an access unit and in the first view, one or more reference candidates in a reference picture list, wherein the one or more reference candidates comprise view components in the access unit and in the reference views indicated by the reference view information, wherein the number of reference candidates is equal to the number of reference views;
- means for encoding the first view component based on the one or more reference candidates in the reference picture list; and
- means for providing, only once for the plurality of view components of the first view, the determined reference view information that is applicable to any view component of the plurality of view components of the first view in an encoded bitstream and that is the same for any view component of the first view including any view component that is used as a random access point and any view component that is not used as a random access point.

54. The apparatus of claim 53, wherein the reference picture list comprises one of a first reference picture list and a second reference picture list, and wherein the reference view information is the same and only provided once for the first reference picture list and the second reference picture list of any view component of the first view, and wherein means for including view components of the one or more reference views as reference candidates comprises means for adding the same view components to the first reference picture list and the second reference picture list.

55. The apparatus of claim 53, wherein the reference view information comprises, for each reference view, an indication of a view order index indicating a decoding order of a view within an access unit.

56. The apparatus of claim 55, wherein the indication of the view order index comprises a difference between the view order index of a reference view and the view order index of the first view.

57. A non-transitory computer-readable storage medium having instructions stored thereon that, when executed, cause one or more processors to:
determine, for any view component of a first view including any view component that is used as a random access point and any view component that is not used as a random access point, reference view information indicating one or more reference views for predicting a plurality of view components of the first view, wherein the plurality of view components of a first view comprise a sequence of view components of the first view that includes at least one view component that is used as a random access point and at least one view component that is not used as a random access point;
include, for encoding a first view component in an access unit and in the first view, one or more reference candidates in a reference picture list, wherein the one or more reference candidates comprise view components in the access unit and in the reference views indicated by the reference view information, wherein the number of reference candidates is equal to the number of reference views;
encode the first view component based on the one or more reference candidates in the reference picture list; and
provide, only once for the plurality of view components of the first view, the determined reference view information that is applicable to any view component of the plurality of view components of the first view in an encoded bitstream and that is the same for any view component of the first view including any view component that is used as a random access point and any view component that is not used as a random access point.

58. The non-transitory computer-readable storage medium of claim 57, wherein the reference picture list comprises one of a first reference picture list and a second reference picture list, and wherein the reference view information is the same and only provided once for the first reference picture list and the second reference picture list of any view component of the first view, and wherein to include view components of the one or more reference views as reference candidates the instructions cause the one or more processors to add the same view components to the first reference picture list and the second reference picture list.

59. The non-transitory computer-readable storage medium of claim 57, wherein the reference view information comprises, for each reference view, an indication of a view order index indicating a decoding order of a view within an access unit.

60. The non-transitory computer-readable storage medium of claim 59, wherein the indication of the view order index comprises a difference between the view order index of a reference view and the view order index of the first view.

* * * * *